(12) United States Patent
Komazawa et al.

(10) Patent No.: US 10,279,324 B2
(45) Date of Patent: May 7, 2019

(54) FLUID SUPPLY PIPE

(71) Applicant: SIO CO., LTD., Hachioji-shi, Tokyo (JP)

(72) Inventors: Masuhiko Komazawa, Hachioji (JP); Masaru Ohki, Hachioji (JP)

(73) Assignee: SIO CO., LTD., Tokyo (JP)

( * ) Notice: Subject to any disclaimer, the term of this patent is extended or adjusted under 35 U.S.C. 154(b) by 0 days.

(21) Appl. No.: 15/864,184

(22) Filed: Jan. 8, 2018

(65) Prior Publication Data

US 2018/0193810 A1    Jul. 12, 2018

(30) Foreign Application Priority Data

Jan. 9, 2017 (KR) ........................ 10-2017-0003140

(51) Int. Cl.
| | |
|---|---|
| *B01F 5/06* | (2006.01) |
| *B24B 57/02* | (2006.01) |
| *B23Q 11/10* | (2006.01) |
| *B24B 55/02* | (2006.01) |
| *F16L 9/00* | (2006.01) |

(Continued)

(52) U.S. Cl.
CPC .......... *B01F 5/0665* (2013.01); *B01F 5/0675* (2013.01); *B01F 5/0676* (2013.01); *B23Q 11/10* (2013.01); *B24B 55/02* (2013.01); *B24B 57/02* (2013.01); *F16L 9/006* (2013.01); *F16L 15/006* (2013.01); *F16L 55/07* (2013.01)

(58) Field of Classification Search
CPC .................................................. B01F 5/0614
USPC ..................... 138/42; 366/337–339
See application file for complete search history.

(56) References Cited

U.S. PATENT DOCUMENTS

| | | | | |
|---|---|---|---|---|
| 1,373,829 | A | * | 4/1921 | Perdue .................. F23D 14/465 137/893 |
| 2,831,754 | A | * | 4/1958 | Manka ............... B01D 11/0473 239/404 |

(Continued)

FOREIGN PATENT DOCUMENTS

| | | |
|---|---|---|
| JP | 1999-254281 | 9/1999 |
| JP | 2004-033962 | 2/2004 |

(Continued)

OTHER PUBLICATIONS

Taiwanese Office Action for Taiwanese Patent Application No. 106129509 dated Feb. 23, 2018, 14 pages.

*Primary Examiner* — David L Sorkin

(74) *Attorney, Agent, or Firm* — Amin, Turocy & Watson LLP

(57) ABSTRACT

A fluid supply pipe according to an embodiment of the invention includes a first internal structure, a second internal structure, and a pipe body configured to house the first internal structure and the second internal structure, and the pipe body has an inlet and an outlet. The first internal structure includes a head portion comprising a plurality of spiral vanes, and a body portion positioned downstream from the head portion and comprising a plurality of protrusions on its outer circumferential surface. The second internal structure formed in a hollow shaft shape includes a head portion comprising a plurality of spiral vanes, and a body portion positioned downstream from the head portion and comprising a plurality of protrusions on its outer circumferential surface. At least a part of the first internal structure is housed in the hollow of the second internal structure.

23 Claims, 26 Drawing Sheets

(51) Int. Cl.
*F16L 15/00* (2006.01)
*F16L 55/07* (2006.01)

(56) References Cited

U.S. PATENT DOCUMENTS

| | | | | |
|---|---|---|---|---|
| 5,865,537 | A | * | 2/1999 | Streiff ................... B01F 3/10 366/137 |
| 6,027,241 | A | * | 2/2000 | King .................. B01F 3/0873 138/38 |
| 6,095,899 | A | | 8/2000 | Elmar et al. |
| 7,066,409 | B2 | | 6/2006 | Negoro |
| 7,204,260 | B2 | | 4/2007 | Urabe et al. |
| 8,864,367 | B2 | | 10/2014 | Hanada et al. |
| 2014/0041694 | A1 | | 2/2014 | Miyazaki et al. |
| 2016/0001240 | A1 | | 1/2016 | Okada et al. |

FOREIGN PATENT DOCUMENTS

| | | |
|---|---|---|
| JP | 2011-161323 | 8/2011 |
| JP | 3184786 | 6/2013 |
| JP | 2014-161792 | 9/2014 |
| JP | 3196283 | 2/2015 |
| JP | 3205595 | 7/2016 |
| JP | 2017-080721 | 5/2017 |
| TW | 200408455 A | 6/2004 |
| TW | 201018527 A | 5/2010 |
| TW | 201425570 A | 7/2014 |
| TW | 201515693 A | 5/2015 |
| WO | 2014/184585 A2 | 11/2014 |
| WO | 2014204399 | 12/2014 |

\* cited by examiner

FLUID SUPPLY PIPE

CROSS-REFERENCE TO RELATED APPLICATIONS

This application is based upon and claims the benefit of priority under 35 USC 119 of Korean Patent Application No. 2017-0003140 filed on Jan. 9, 2017, the entire disclosure of which is incorporated herein by reference in its entirety for all purposes.

BACKGROUND OF THE INVENTION

1. Field of the Invention

The present invention relates to a fluid supply pipe for an apparatus for supplying a fluid. More specifically, the present invention relates to a fluid supply pipe which applies a predetermined flow characteristic to a fluid flowing therethrough. For example, the fluid supply pipe of the present invention is applicable to a cutting fluid supply apparatus for various machine tools such as a grinding machine, a drilling machine, and a cutting machine.

2. Description of the Related Art

Conventionally, when a workpiece made of a metal or the like is machined into a desired shape by a machine tool such as the grinding machine or the drilling machine, a machining fluid (for example, coolant) is supplied to a contact portion between the workpiece and a tool (for example, a blade) in order to cool heat generated during machining or remove debris of the workpiece (also referred to as chips) from a machining spot. Cutting heat caused by high pressure and frictional resistance at the contact portion between the workpiece and the blade abrades the edge of the blade and lowers the strength of the blade, thereby reducing tool life of the blade. In addition, if the chips of the workpiece are not sufficiently removed, they can stick to the edge of the blade during machining, which may degrade machining accuracy.

The machining fluid (also referred to as a cutting fluid) decreases the frictional resistance between the tool and the workpiece, removes the cutting heat, and performs cleaning to remove the chips cut off from a surface of the workpiece. For this, the machining fluid should have a low coefficient of friction, a high boiling point, and good penetration into the contact portion between the blade and the workpiece.

For example, Japanese Patent Application Laid-Open Publication No. 1999-254281 published on Sep. 21, 1999 (published also as U.S. Pat. No. 6,095,899), discloses providing a gas emitting means for emitting a gas (for example, air) in a machining apparatus in order to forcibly infiltrate a machining liquid into a contact portion between a working element (i.e. a blade) and a workpiece.

According to the conventional technology as disclosed in the above patent document, the means for emitting the gas at a high speed and high pressure should be provided in the machining apparatus in addition to a means for spraying the machining liquid, thus increasing the cost and the size of the apparatus. Further, in the grinding machine, the machining liquid cannot sufficiently reach a contact portion between a grindstone and the workpiece because the air rotates along the outer circumferential surface of the grindstone together with the grindstone rotating at a high speed. Thus, there is still a problem that it is difficult to cool the heat generated during machining to a desired level because the machining liquid cannot sufficiently penetrate into the contact portion by simply emitting the air in the same direction as the rotation direction of the grindstone.

SUMMARY OF THE INVENTION

The present invention was made in light of the problems mentioned above. An object of the present invention is to provide a fluid supply pipe for applying a predetermined flow characteristic to a fluid flowing therethrough to improve lubricity, penetration, and a cooling effect of the fluid.

In order to achieve the above object, an aspect of the present invention provides a fluid supply pipe including a first internal structure, a second internal structure, and a pipe body configured to house the first internal structure and the second internal structure. The pipe body has an inlet and an outlet. The first internal structure includes a head portion including a plurality of spiral vanes, and a body portion positioned downstream from the head portion and including a plurality of protrusions on its outer circumferential surface. The second internal structure formed in a hollow shaft shape includes a head portion including a plurality of spiral vanes, and a body portion positioned downstream from the head portion and including a plurality of protrusions on its outer circumferential surface. At least a part of the first internal structure is housed in the hollow of the second internal structure.

Another aspect of the present invention provides an internal structure of a fluid supply pipe, which includes a pipe body having an inlet and an outlet. The internal structure includes a head portion including a plurality of spiral vanes, the head portion being placed at the inlet side of the pipe body when the internal structure is housed in the pipe body, and a body portion positioned downstream from the head portion and including a plurality of protrusions on its outer circumferential surface. The internal structure has a hollow shaft shape.

If the fluid supply pipe according to some embodiments of the present invention is provided in a fluid supply unit of a machine tool or the like, a cleaning effect is improved over the prior art due to vibration and impact generated during a process in which a plurality of micro bubbles generated in the fluid supply pipe collide with the tool and the workpiece and break. Thus, the life of the tool such as the blade can be extended and the cost of replacing the tool can be reduced. In addition, the characteristic applied by the fluid supply pipe according to some embodiments of the present invention can increase the cooling effect and improve the lubricity by increasing penetration of the fluid, thereby enhancing the precision of machining.

Further, according to many embodiments of the present invention, the fluid supply pipe includes a plurality of internal structures and each of the plurality of internal structures has a shape and features which enable the internal structure to be easily assembled with a pipe body and other internal structure(s). Therefore, it is possible to assemble the plurality of internal structures and the pipe body by a simple process.

The fluid supply pipe of the present invention can be applied to a machining fluid supply unit in various machine tools such as the grinding machine, the cutting machine, and the drilling machine. In addition, it can be effectively used in an apparatus for mixing two or more fluids (liquid and liquid, liquid and gas, or gas and gas).

BRIEF DESCRIPTION OF THE DRAWINGS

The above and further objects and novel features of the present invention will more fully appear from the following detailed description when the same is read in conjunction with the accompanying drawings. It is to be expressly understood, however, that the drawings are for the purpose of illustration only and are not intended to limit the scope of the invention.

Here.

DETAILED DESCRIPTION OF THE PREFERRED EMBODIMENT

Embodiments in which the present invention is applied to machine tools such as a grinding machine will be mainly described herein. However, the field of application of the present invention is not intended to be limited to the illustrated examples. The present invention is applicable to various situations requiring supply of a fluid, such as a household shower nozzle or a fluid mixing apparatus. For example, a shower nozzle includes a fluid supply pipe according to an embodiment of the present invention. Here, water of a predetermined temperature flows into the fluid supply pipe, a predetermined flow characteristic is applied to the water, and the shower nozzle discharges the water from the fluid supply pipe to improve a cleaning effect. As another example, a fluid mixing apparatus includes a fluid supply pipe according to an embodiment of the present invention. The fluid mixing apparatus allows a plurality of fluids having different properties to flow into the fluid supply pipe to apply a predetermined flow characteristic to the fluids to mix them and discharges the mixed fluids.

Hereinafter, the embodiments of the present invention will be described with reference to the accompanying drawings.

Figure 1:
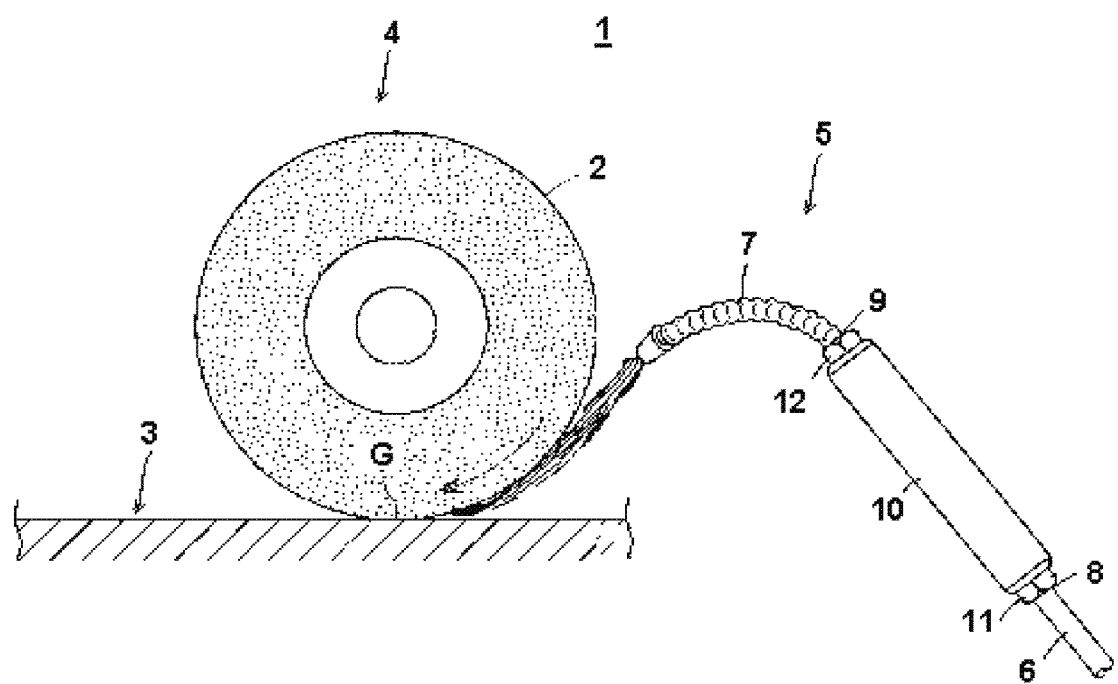
FIG. 1 shows a grinding machine including a fluid supply unit to which the present invention is applied.

FIG. 1 shows an embodiment of a grinding machine including a fluid supply unit to which the present invention is applied. As shown, a grinding machine 1 includes a grinding unit 4 including a grinding blade (a grindstone) 2, a table for moving a workpiece 3 in two dimensions (not shown), and a column for vertically moving the workpiece or the grinding blade (not shown), and a fluid supply unit 5 for supplying a fluid (i.e. coolant) to the grinding blade or the workpiece. The grinding blade 2 is rotationally driven in the clockwise direction in the plane of FIG. 1 by a driving source (not shown in the drawing). A surface of the workpiece 3 is ground by friction between the outer circumferential surface of the grinding blade 2 and the workpiece 3 at a grinding spot G. Although not shown in the drawing, the fluid supply unit 5 includes a tank in which the coolant (for example, water) is stored and a pump for discharging the coolant from the tank.

The fluid supply unit 5 includes a delivery pipe 6 into which a fluid stored in the tank is flowed by the pump, a fluid supply pipe 10 having a plurality of internal structures for applying a predetermined flow characteristic to the fluid, and a nozzle 7 having a discharge port disposed close to the grinding spot G. The fluid supply pipe 10 and the delivery pipe 6 are connected, for example, by engaging a female screw of a nut 11 which is a connecting member provided on the side of an inlet 8 of the fluid supply pipe 10 with a male screw (not shown in the drawing) formed on the outer peripheral surface of one end of the delivery pipe 6 (by thread cutting, for example). The fluid supply pipe 10 and the nozzle 7 are connected, for example, by engaging a female screw of a nut 12 which is a connecting member provided on the side of an outlet 9 of the fluid supply pipe 10 with a male screw (not shown in the drawing) formed on the outer peripheral surface of one end of the nozzle 7 (by thread cutting, for example). The fluid flowing into the fluid supply pipe 10 from the delivery pipe 6 has a predetermined flow characteristic applied by the internal structures while passing though the fluid supply pipe 10. The fluid is discharged toward the grinding spot G through the outlet 9 of the fluid supply pipe 10 and the nozzle 7. According to many embodiments of the present invention, the fluid passing through the fluid supply pipe includes micro bubbles. Hereinafter, various embodiments of the internal structures of the fluid supply pipe will be described with reference to the drawings.

First Embodiment

Figure 2:
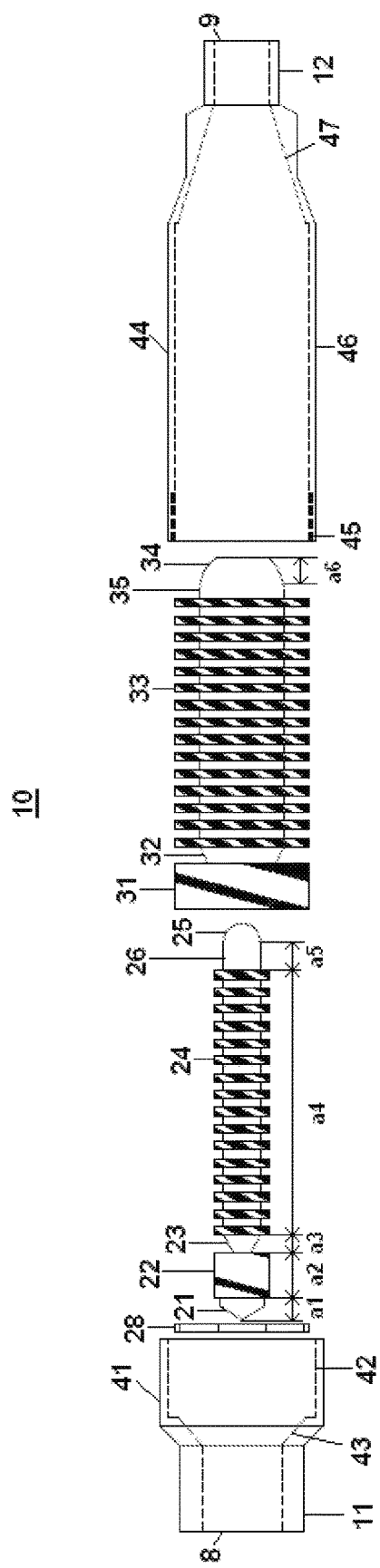
FIG. 2 is a side exploded view of a fluid supply pipe according to a first embodiment of the present invention.
Figure 3:
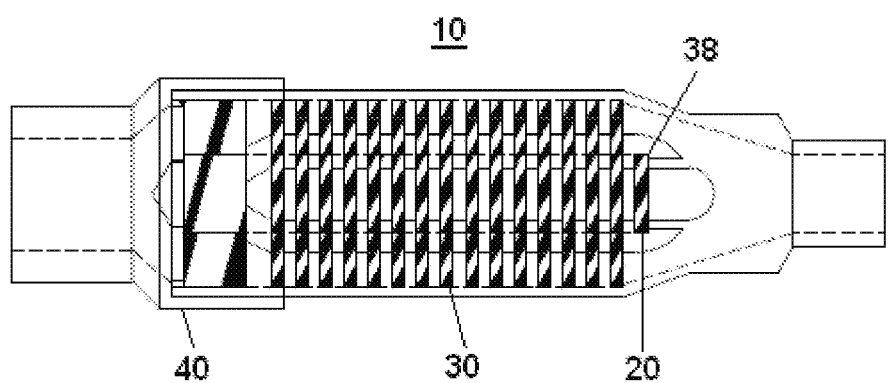
FIG. 3 is a side sectional view of the fluid supply pipe according to the first embodiment of the present invention.
Figure 4:
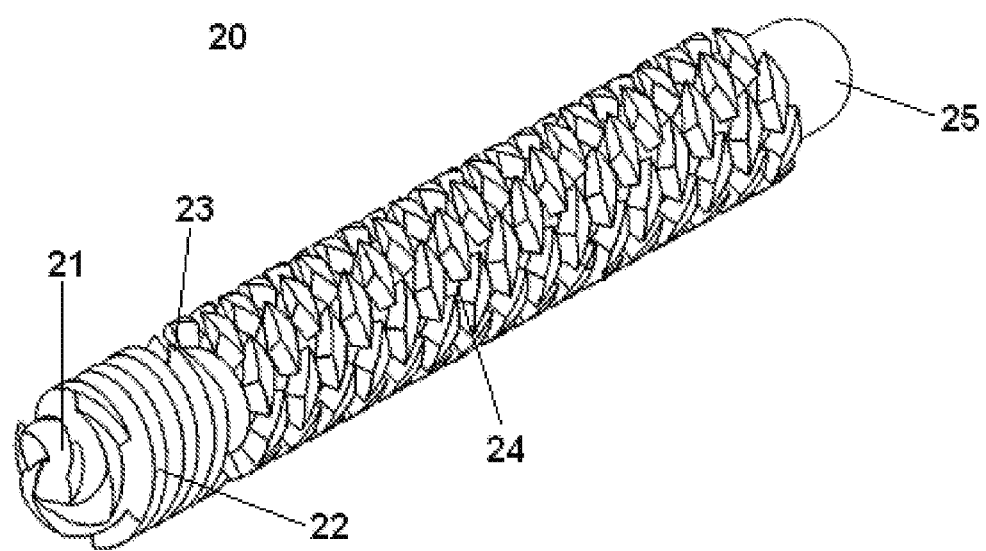
FIG. 4 is a three-dimensional view of a first internal structure of the fluid supply pipe according to the first embodiment of the present invention.
Figure 5:
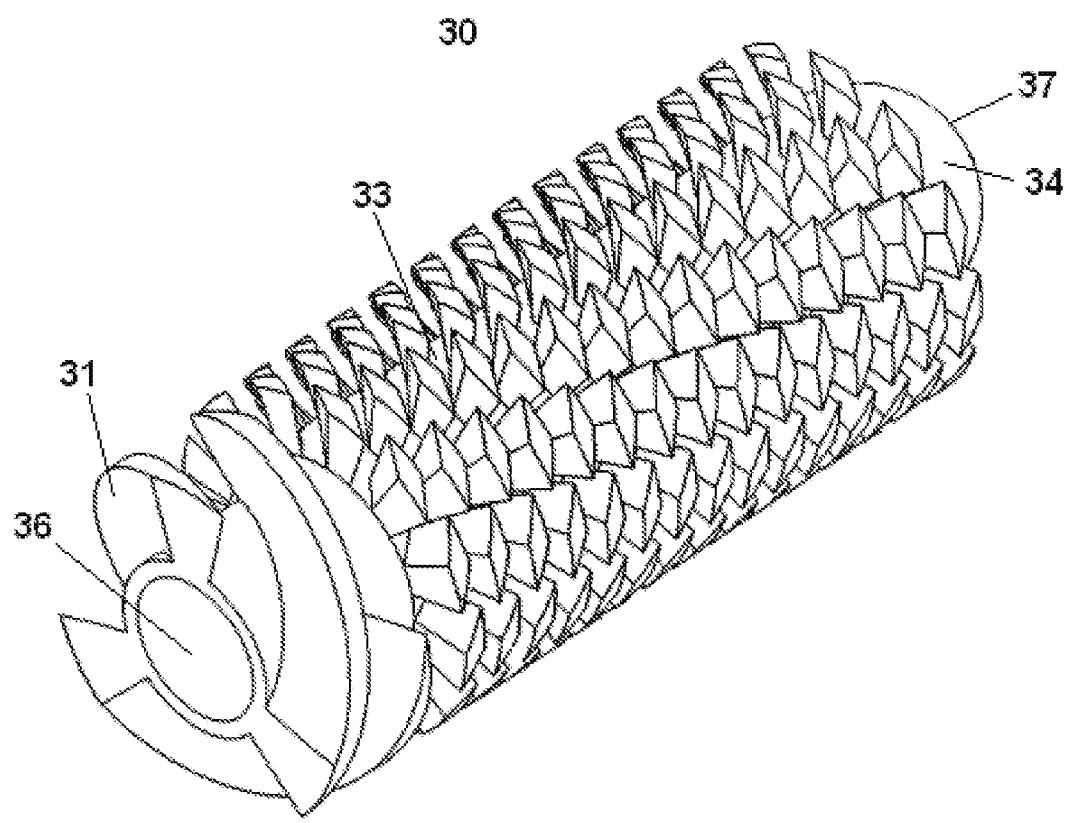
FIG. 5 is a three-dimensional view of a second internal structure of the fluid supply pipe according to the first embodiment of the present invention.
Figure 6:
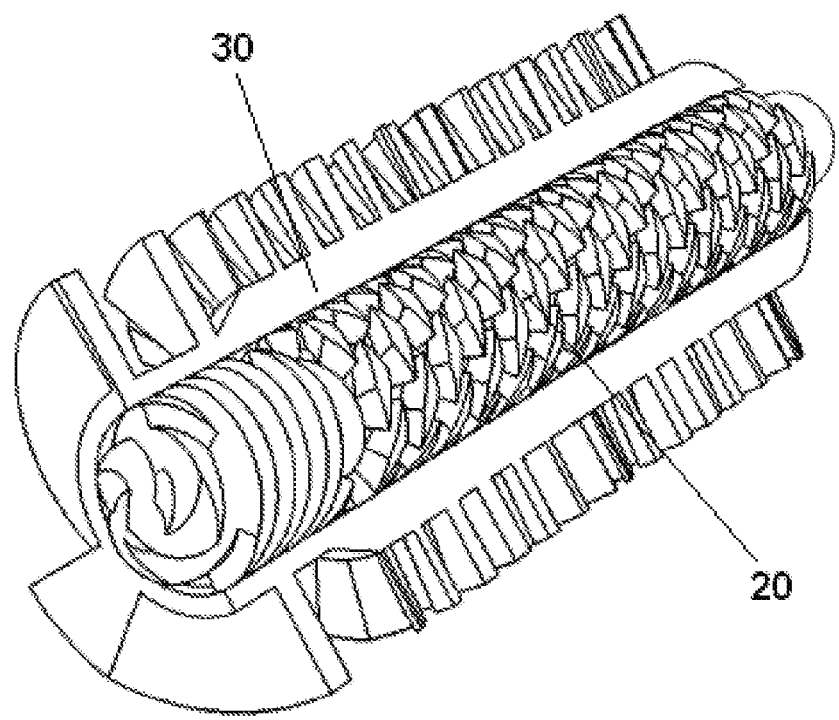
FIG. 6 is a three-dimensional perspective view showing a state in which the first internal structure is put in the hollow of the second internal structure according to the first embodiment of the present invention.

FIG. 2 is a side exploded view of the fluid supply pipe 10, and FIG. 3 is a side sectional view of the fluid supply pipe 10. FIG. 4 is a three-dimensional view of a first internal structure 20 of the fluid supply pipe 10, FIG. 5 is a three-dimensional view of a second internal structure 30 of the fluid supply pipe 10, and FIG. 6 is a three-dimensional perspective view showing a state in which the first internal structure 20 is put in a hollow of the second internal structure 30. In FIGS. 2 and 3, the fluid flows from the inlet 8 to the outlet 9. As shown in FIGS. 2 and 3, the fluid supply pipe 10 includes the first internal structure 20, the second internal structure 30, and a pipe body 40.

The pipe body 40 includes an inlet side member 41 and an outlet side member 44. Each of the inlet side member 41 and the outlet side member 44 is formed in a hollow tube shape. The inlet side member 41 has the inlet 8 having a predetermined diameter at one end and a female screw 42 at the other end which is formed by thread-cutting an inner circumferential surface for connection with the outlet side member 44. As explained with respect to FIG. 1, the nut 11 is integrally formed with the inlet 8. As shown in FIG. 2, the inner diameters of the both ends of the inlet side member 41, i.e. the inner diameter of the inlet 8 and the inner diameter of the female screw 42 are different from each other, and the inner diameter of the inlet 8 is smaller than the inner diameter of the female screw 42. A tapered portion 43 is formed between the inlet 8 and the female screw 42. Although the nut 11 is formed as a part of the inlet side member 41 in the present embodiment, the present invention is not limited to this embodiment. In another embodiment, the nut 11 is manufactured as a separate component from the inlet side member 41 and connected to an end of the inlet side member 41.

The outlet side member 44 has the outlet 9 having a predetermined diameter at one end and a male screw 45 at the other end which is formed by thread-cutting an outer circumferential surface for connection with the inlet side member 41. The diameter of the outer circumferential surface of the male screw 45 of the outlet side member 44 is the same as the inner diameter of the female screw 42 of the inlet side member 41. As explained with respect to FIG. 1, the nut 12 is integrally formed with the outlet 9. A tubular portion 46 and a tapered portion 47 are formed between the nut 12 and the male screw 45. The inner diameters of the both ends of the outlet side member 44, i.e. the inner diameter of the outlet 9 and the inner diameter of the male screw 45 are different from each other, and the inner diameter of the outlet 9 is smaller than the inner diameter of the male screw 45. Although the nut 12 is formed as a part of the outlet side member 44 in the present embodiment, the present invention is not limited to this embodiment. In another embodiment, the nut 12 is manufactured as a separate component from the outlet side member 44 and connected to an end of the outlet side member 44. The pipe body 40 is formed by connecting the inlet side member 41 and the outlet side member 44 by screw-joining the female screw 42 of the inner circumferential surface of the inlet side member 41 and the male screw 45 of the outer circumferential surface of the outlet side member 44.

The above described configuration of the pipe body 40 is merely an embodiment, and the present invention is not limited to the configuration. For example, connection of the inlet side member 41 and the outlet side member 44 is not limited to the screw-joining and any method for connecting mechanical components known in the art is applicable. Further, the shapes of the inlet side member 41 and the outlet side member 44 are not limited to ones shown in FIGS. 2 and 3, respectively. A designer of the fluid supply pipe 10 may arbitrarily design them or change the shapes according to applications of the fluid supply pipe 10. Each of the inlet side member 41 and the outlet side member 44 can be made of a metal such as steel, plastic, or the like.

Referring to FIG. 3 together, the fluid supply pipe 10 includes the second internal structure 30 of a hollow shaft type, which is housed in the pipe body 40, and the first internal structure 20, which is housed in the hollow of the second internal structure 30. The fluid supply pipe 10 is assembled by housing the first internal structure 20 and the second internal structure 30 in the outlet side member 44 after inserting the first internal structure 20 into the hollow of the second internal structure 30, placing a press plate 28 at the head of the second internal structure 30, and then engaging the male screw 45 of the outer circumferential surface of the outlet side member 44 with the female screw 42 of the inner circumferential surface of the inlet side member 41. The fluid flowing into the fluid supply pipe 10 through the inlet 8 is divided and flows into the hollow of the second internal structure 30 and the inside of the outlet side member 44.

The first internal structure 20 can be formed by processing a cylindrical member made of a metal such as steel or by molding plastic, for example. As shown in FIGS. 2 and 4, the first internal structure 20 includes a fluid diffusing portion 21, a first swirl generating portion 22, a first bubble generating portion 24, and a first guiding portion 25. The first swirl generating portion 22 corresponds to a part or the whole of the head portion of the first internal structure 20, and the first bubble generating portion 24 corresponds to a part or the whole of the body portion of the first internal structure 20. In the case of producing the first internal structure 20 by machining a cylindrical member, the fluid diffusing portion 21 is formed by machining (for example, turning, spinning, or the like) one end of the cylindrical member in a cone shape. The fluid diffusing portion 21 diffuses the fluid flowing into the inlet side member 41 through the inlet 8 outward from the center of the pipe, i.e. radially. Although the fluid diffusing portion 21 has the cone shape in the present embodiment, the present invention is not limited thereto and the fluid diffusing portion 21 may have a different shape. In an embodiment, the fluid diffusing portion is formed in a dome shape.

The first swirl generating portion 22 is formed by machining a part of the cylindrical member, for example, and includes a shaft portion having a circular cross-section and three spiral vanes, as shown in FIG. 4. Referring to FIG. 2, the length of the first swirl generating portion 22 (a2) is longer than the length of the fluid diffusing portion 21 (a1) and is shorter than the length of the first bubble generating portion 24 (a4) in the present embodiment. Further, it is preferable that the radius of a portion of the fluid diffusing portion 21 of which cross-sectional area is the maximum, is smaller than the radius of the first swirl generating portion 22 (i.e. the distance from the center of the shaft portion to the end of each of the vanes). Each of the vanes of the first swirl generating portion 22 has its end spaced by 120 degrees from each other in the circumferential direction of the shaft portion. The vanes are formed in a spiral shape in the counterclockwise direction at a predetermined interval on the outer circumferential surface from one end to the other end of the shaft portion. The number of the vanes is three in the present invention, but the present invention is not limited this embodiment. Further, the shape of the vanes of the first swirl generating portion 22 is not particularly limited if the vanes can cause swirling flow of the fluid which has been diffused by the fluid diffusing portion 21 and has flowed into the first swirl generating portion 22 while the fluid passes between the vanes. In the present embodiment, the outer diameter of the first swirl generating portion 22 is such that it is close to the inner peripheral surface of the second internal structure 30 when the first internal structure 20 is housed in the hollow of the second internal structure 30.

Figure 7:
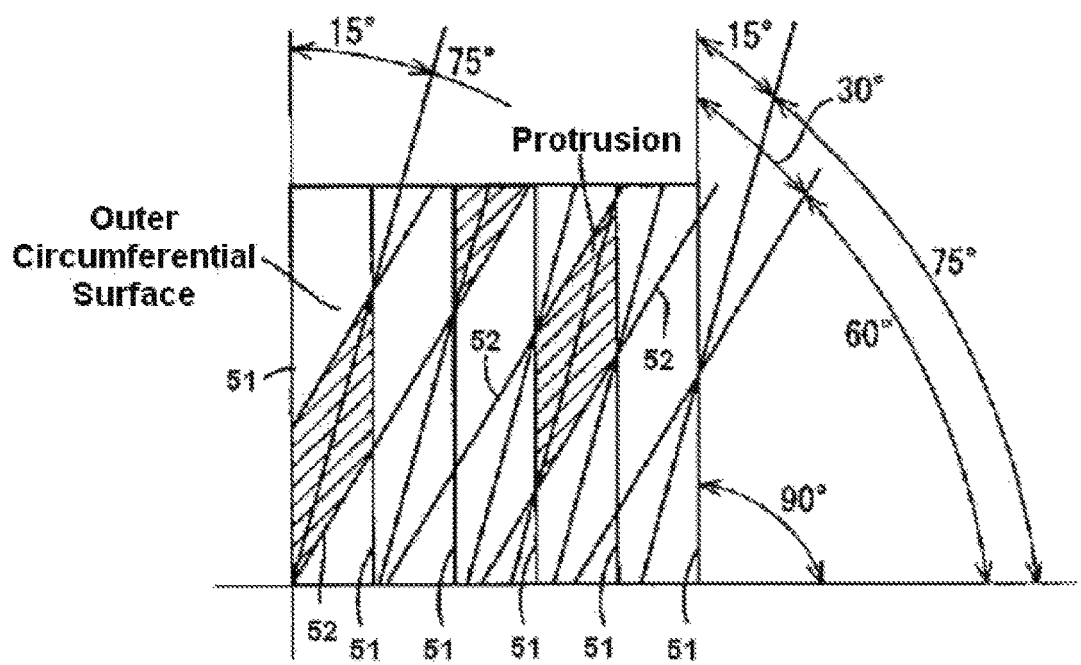
FIG. 7 is a drawing for explaining a method for forming rhombic protrusions of the first and second internal structures of the fluid supply pipe according to the first embodiment of the present invention.

As shown in FIGS. 2 and 4, a plurality of rhombic (i.e. diamond-shaped) protrusions are formed in a net shape on the outer circumferential surface of a shaft portion having a circular cross-section of the first bubble generating portion 24. Each of the plurality of rhombic protrusions is formed, for example, by grinding the cylindrical member so as to protrude outward from the outer circumferential surface of the shaft portion. More specifically, FIG. 7 shows an exemplary method for forming the rhombic protrusions. A plurality of lines 51 with predetermined spacing therebetween in the direction of 90 degrees with respect to the longitudinal direction of the cylindrical member and a plurality of lines 52 having a predetermined angle (for example, 60 degrees) with respect to the longitudinal direction with predetermined spacing therebetween are intersected with each other. Spaces between the line 51 and the line 51 are ground alternately, and spaces between the tilted line 52 and the tilted line 52 are ground alternately. By this, the plurality of rhombic protrusions protruding from the outer circumferential surface of the shaft portion are formed regularly and alternately in the vertical direction (the circumferential direction of the shaft portion) and the horizontal direction (the longitudinal direction of the shaft portion). Further, in the present embodiment, the outer diameter of the first bubble generating portion 24 is such that it is close to the inner circumferential surface of the second internal structure 30 when the first internal structure 20 is housed in the hollow of the second internal structure 30.

In the present embodiment, the diameter of the shaft portion of the first swirl generating portion 22 is smaller than the diameter of the shaft portion of the first bubble generating portion 24, as shown in FIG. 2. Thus, there is a first tapered portion 23 (length: a3) between the first swirl generating portion 22 and the first bubble generating portion 24. However, the present invention is not limited to this embodiment. In another embodiment, the shaft portion of the first swirl generating portion 22 and the shaft portion of the first bubble generating portion 24 have the same diameter.

The first guiding portion 25 can be formed by machining the downstream end of the cylindrical member in a dome shape. As shown in FIG. 2, the shaft portion of the first bubble generating portion 24 is extended between the first bubble generating portion 24 and the first guiding portion 25. In the present embodiment, the length of the shaft extension portion 26 (a5) is determined such that the first guiding portion 25 of the first internal structure 20 protrudes out of the second internal structure 30 when the first internal structure 20 is housed in the hollow of the second internal structure 30, as shown in FIG. 3. For example, the length a5 of the shaft extension portion 26 is the same as the length of a second guiding portion 34 of the second internal structure 30 (a6). Although the first guiding portion 25 has the dome shape in the present embodiment, the present invention is not limited thereto and the first guiding portion 25 may have a different shape. In a different embodiment, the first internal structure 20 does not include the first guiding portion 25.

As shown in FIGS. 2 and 5, the second internal structure 30 has the hollow shaft shape, and can be formed by processing a cylindrical member made of a metal such as steel or by molding plastic, for example. The second internal structure 30 includes a second swirl generating portion 31, a second bubble generating portion 33, and the second guiding portion 34. The second swirl generating portion 31 corresponds to a part or the whole of the head portion of the second internal structure 30, and the second bubble generating portion 33 corresponds to a part or the whole of the body portion of the second internal structure 30. In the present embodiment, the inner diameter of the second internal structure 30 (in other words, the diameter of the hollow of the second internal structure 30) is bigger on the side of its inlet 36 than on the side of its outlet 37. As shown in FIG. 3, the first internal structure 20 is inserted through the inlet 36 of the hollow of the second internal structure 30 and the first guiding portion 25 of the first internal structure 20 protrudes out of the second internal structure 30 through the outlet 37 of the hollow of the second internal structure 30. In the present embodiment, the inlet and the outlet of the hollow of the second internal structure 30 are circular.

The second swirl generating portion 31 of the second internal structure 30 includes a shaft portion having a circular cross-section and three spiral vanes, as shown in FIG. 5. In the case of producing the second internal structure 30 by machining a cylindrical member, the second swirl generating portion 31 is formed by machining one end of the cylindrical member. Each of the vanes of the second swirl generating portion 31 has its end spaced by 120 degrees from each other in the circumferential direction of the shaft portion. The vanes are formed in a spiral shape in the counterclockwise direction at a predetermined interval on the outer circumferential surface from one end to the other end of the shaft portion. The number of the vanes is three in the present invention, but the present invention is not limited this embodiment. Further, the shape of the vanes of the second swirl generating portion 31 is not particularly limited if the vanes can cause swirling flow of the fluid which has been diffused by the fluid diffusing portion 21 of the first internal structure 20 and has flowed into the second swirl generating portion 31 while the fluid passes between the vanes. In the present embodiment, the outer diameter of the second swirl generating portion 31 is such that it is close to the inner peripheral surface of the outlet side member 44 of the pipe body 40 when the second internal structure 30 is housed in the pipe body 40.

As shown in FIGS. 2 and 5, a plurality of rhombic (i.e. diamond-shaped) protrusions are formed in a net shape on the outer circumferential surface of a shaft portion having a circular cross-section of the second bubble generating portion 33. Each of the plurality of rhombic protrusions is formed, for example, by grinding the cylindrical member so as to protrude outward from the outer circumferential surface of the shaft portion. For example, the rhombic protrusions are formed by the method shown in FIG. 7. In the present embodiment, the outer diameter of the second bubble generating portion 33 is such that it is close to the inner peripheral surface of the outlet side member 44 of the pipe body 40 when the second internal structure 30 is housed in the pipe body 40.

In the present embodiment, the diameter of the shaft portion of the second swirl generating portion 31 is smaller than the diameter of the shaft portion of the second bubble generating portion 33, as shown in FIG. 2. Thus, there is a second tapered portion 32 between the second swirl generating portion 31 and the second bubble generating portion 33. However, the present invention is not limited to this embodiment. In a different embodiment, the shaft portion of the second swirl generating portion 31 and the shaft portion of the second bubble generating portion 33 have the same diameter.

The second guiding portion 34 can be formed by machining the downstream end of the cylindrical member in a shape of a truncated dome (i.e. a dome whose head is cut). As shown in FIG. 2, the shaft portion of the second bubble generating portion 33 is extended between the second bubble generating portion 33 and the second guiding portion 34. The length of the shaft extension portion 35 is determined based on at least one of the convenience of processing, a Coanda effect of the second guiding portion 34, and the size of the first internal structure 20, for example. The shape of the second guiding portion 34 is not limited to the truncated dome and can be formed in a different shape. In a different embodiment, the second guiding portion 34 is formed in a truncated cone shape.

It is preferable that the diameter of the hollow of the second internal structure 30 is bigger on the side of its inlet 36 than on the side of its outlet 37. In the present embodiment, the inner diameter of the second internal structure 30 is uniform from the inlet 36 to the extended portion 35 of the shaft portion of the second bubble generating portion 33 as shown in FIG. 3. This inner diameter is bigger that the inner diameter of the second guiding portion 34. Thus, a step 38 exists at the boundary between the shaft extension portion 35 and the second guiding portion 34. Further, the radius of the outlet of the hollow of the second internal structure 30 is smaller than the maximum distance from the center of the first bubble generating portion 24 of the first internal structure 20 to the end of each protrusion. By this, it is possible to house the first internal structure 20 in the hollow of the second internal structure 30 through the inlet 36 of the second internal structure 30 and to prevent the first internal structure 20 from escaping to the outside of the second internal structure 30 through the outlet 37. The inner diameter of the second guiding portion 34 is bigger than the outer diameter of the first guiding portion 25 of the first internal structure 20.

Figure 8A:
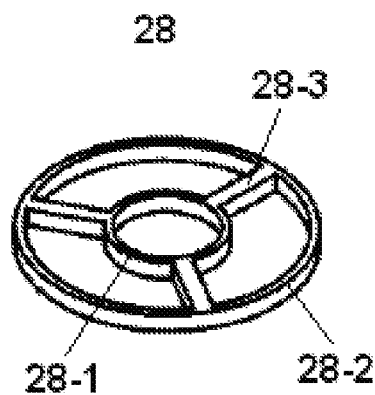
FIG. 8A is a three-dimensional view of a press plate according to the first embodiment of the present invention.
Figure 8B:
FIG. 8B is a side view of the press plate.
Figure 8C:
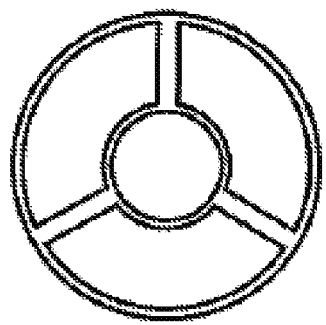
FIG. 8C is a top view of the press plate.

FIG. 8A is a three-dimensional view of the press plate 28 according to the present embodiment, FIG. 8B is a side view of the press plate 28, and FIG. 8C is a top view of the press plate 28. As shown in FIGS. 8A to 8C, the press plate 28 includes a ring 28-1 of a small radius, a ring 28-2 of a radius bigger than the radius of the ring 28-1, and three supporting arms 28-3 connecting the ring 28-1 and the ring 28-2. As shown in FIG. 2, the outer diameter of the ring 28-2 is such that the ring 28-2 is close to the inner peripheral surface of the female screw 42 of the inlet side member 41. The press plate 28 is made of a metal such as steel or plastic, for example.

In the present embodiment, the radius of the ring 28-1 is bigger than the maximum radius of the fluid diffusing portion 21 of the first internal structure 20 and smaller than the maximum radius of the first swirl generating portion 22 (i.e. the distance from the center of the shaft portion of the first swirl generating portion 22 to the end of each of the vanes), as shown in FIG. 2. By this dimensional relationship, the press plate 28 prevents the first internal structure 20 from escaping from the pipe body 40 through the inlet 8 of the pipe body 40. The fluid supply pipe 10 is assembled by housing the first internal structure 20 and the second internal structure 30 in the outlet side member 44 after inserting the first internal structure 20 into the hollow of the second internal structure 30, placing the press plate 28 at the head of the second internal structure 30 such that the fluid diffusing portion 21 of the first internal structure 20 protrudes through the ring 28-1, and then engaging the male screw 45 of the outer circumferential surface of the outlet side member 44 with the female screw 42 of the inner circumferential surface of the inlet side member 41. For this assembly, the first internal structure 20 cannot escape from the pipe body 40 through the inlet 8 by the press plate 28 and from the second internal structure 30 through the outlet 37 of the second internal structure 30 because the radius of the outlet 37 is smaller than the radius of the inlet 36. The press plate 28 keeps the first internal structure 20 confined in the hollow of the second internal structure 30.

Hereinafter, flow of the fluid passing through the fluid supply pipe 10 will be described with reference to FIGS. 2 to 6 and 8. The fluid enters the inlet 8 of the fluid supply pipe 10 through the delivery pipe 6 (see FIG. 1) by an electric pump whose impeller rotates clockwise or counterclockwise. The fluid bumps into the fluid diffusing portion 21 of the first internal structure 20 protruding through the ring 28-1 and diffuses outward from the center of the fluid supply pipe 10 (i.e. radially) while passing through the internal space of the tapered portion 43 of the inlet side member 41. Then, a part of the fluid flows into the hollow of the second internal structure 30 in which the first internal structure 20 is housed and the rest flows into the internal space of the outlet side member 44 in which the second internal structure 30 is housed.

The fluid flowing into the hollow of the second internal structure 30 in which the first internal structure 20 is housed passes between the three vanes of the first swirl generating portion 22 formed in the spiral shape in the counterclockwise direction. The fluid diffusing portion 21 induces the fluid flowing into the fluid supply pipe 10 through the delivery pipe 6 to enter the first swirl generating portion 22 effectively. The fluid vigorously swirls due to the vanes of the first swirl generating portion 22 and is sent to the first bubble generating portion 24 past the tapered portion 23.

Then, the fluid passes between the plurality of rhombic protrusions formed regularly on the outer circumferential surface of the shaft portion of the first bubble generating portion 24. The plurality of rhombic protrusions form a plurality of narrow flow paths. As the fluid passes through the plurality of narrow flow paths formed by the plurality of rhombic protrusions, a flip-flop phenomenon (a phenomenon occurring when the direction in which a fluid flows changes alternately and periodically) occurs to generate a large number of minute vortices. Due to the flip-flop phenomenon, the fluid passing between the plurality of protrusions of the first bubble generating unit 24 in the hollow of the second internal structure 30 flows with directions being changed alternately in a periodic manner, which causes mixing and diffusion of the fluid. The structure of the first bubble generating unit 24 is useful when two or more fluids having different properties need to be mixed.

The first internal structure 20 is configured such that the fluid flows from the upstream side (the first swirl generating portion 22) having a large cross-sectional area to the downstream side (the flow paths formed between the plurality of rhombic protrusions of the first bubble generating portion 24) having a small cross-sectional area. This configuration changes static pressure of the fluid as described below. The relationship between pressure, velocity, and potential energy with no external energy to a fluid is given by the Bernoulli equation.

$$p + \frac{\rho v^2}{2} + gh\rho = k$$

Here, p is the pressure at a point on a streamline, ρ is the density of the fluid, v is the fluid flow speed at the point, g is the gravitational acceleration, h is the height of the point with respect to a reference plane, and k is a constant. The Bernoulli's law expressed as the above equation is the energy conservation law applied to fluids and explains that the sum of all the forms of energy on a streamline is constant for flowing fluids at all times. According to the Bernoulli's law, the fluid velocity is low and the static pressure is high in the upstream side having the large cross-sectional area. On the other hand, the fluid velocity is increased and the static pressure is lowered in the downstream side having the small cross-sectional area.

In the case that the fluid is a liquid, the liquid begins to vaporize when the lowered static pressure reaches the saturated vapor pressure of the liquid. Such a phenomenon in which a liquid is rapidly vaporized because the static pressure becomes lower than the saturated vapor pressure (for water, 3000 to 4000 Pa) in extremely short time at almost constant temperature is called cavitation. The first internal structure 20 of the fluid supply pipe 10 of the present invention causes the cavitation phenomenon. Due to the cavitation phenomenon, the liquid is boiled with minute bubbles of a particle size less than 100 microns existing in the liquid as nuclei or many minute bubbles are generated due to isolation of dissolved gas. That is, many micro bubbles are generated while the fluid passes the first bubble generating portion 24.

In the case of water, one water molecule can form hydrogen bonds with four other water molecules, and this hydrogen bonding network is not easy to break down. Thus, the water has much higher boiling point and melting point than other liquids that do not form hydrogen bonds, and is highly viscous. Since the water having the high boiling point exhibits an excellent cooling effect, the water is frequently used as the coolant for the machine tool for performing operations such as grinding. However, the water has a problem that the size of the water molecule is large and its penetration to a machining spot and/or lubricity is not so good. Thus, conventionally, a special lubricant (i.e. cutting oil) other than the water is frequently used alone or mixed with the water. By using the fluid supply pipe of the present invention, the cavitation phenomenon described above causes vaporization of the water, and, as a result, the hydrogen bonding network of the water is destroyed to lower the viscosity. Further, the micro bubbles generated by the vaporization improve the penetration and lubricity. The improved penetration results in increased cooling efficiency. Therefore, according to the embodiment of the present invention, it is possible to improve machining quality (i.e. the performance of the machine tool) even if only water is used without using a special lubricant.

Then, the fluid flows toward the end of the first internal structure 20 after passing the first bubble generating portion 24. When the fluid flows from the plurality of narrow flow paths formed on the surface of the first bubble generating portion 24 toward the first guiding portion 25 formed in the end portion of the first internal structure 20, the flow path is rapidly expanded. Thus, the flip-flop phenomenon induced by the first bubble generating portion 24 disappears and the Coanda effect occurs. The Coanda effect is the phenomenon in which a fluid flowing around a curved surface is drawn to the curved surface due to a pressure drop between the fluid and the curved surface and thus the fluid flows along the curved surface. Due to the Coanda effect, the fluid is induced to flow along the surface of the first guiding portion 25. The fluid induced by the dome-shaped first guiding portion 25 toward the center passes the tapered portion 47 of the outlet side member 44 and flows out of the outlet 9.

The fluid flowing into the internal space of the outlet side member 44 in which the second internal structure 30 is housed passes between the three vanes of the second swirl generating portion 31 formed in the spiral shape in the counterclockwise direction. The fluid vigorously swirls due to the vanes of the second swirl generating portion 31 and is sent to the second bubble generating portion 33 past the tapered portion 32. Then, the fluid passes between the plurality of rhombic protrusions formed regularly on the outer circumferential surface of the shaft portion of the second bubble generating portion 33. As the fluid passes through a plurality of narrow flow paths formed by the plurality of rhombic protrusions, the flip-flop phenomenon occurs to generate a large number of minute vortices. The flip-flop phenomenon causes mixing and diffusion of the fluid.

Similarly to the first internal structure 20, the second internal structure 30 is configured such that the fluid flows from the upstream side (the second swirl generating portion 31) having a large cross-sectional area to the downstream side (the flow paths formed between the plurality of rhombic protrusions of the second bubble generating portion 33) having a small cross-sectional area. As described above, the configuration of the second internal structure 30 causes the cavitation phenomenon. Due to the cavitation phenomenon, the liquid is boiled or many minute bubbles are generated due to isolation of dissolved gas. That is, many micro bubbles are generated while the fluid passes the second bubble generating portion 33.

Then, the fluid flows toward the end of the second internal structure 30 after passing the second bubble generating portion 33. When the fluid flows from the plurality of narrow flow paths formed on the surface of the second bubble generating portion 33 toward the second guiding portion 34 formed in the end portion of the second internal structure 30, the flow path is rapidly expanded and the Coanda effect occurs. As described above, due to the Coanda effect, the fluid is induced to flow along the surface of the second guiding portion 34. The fluid induced by the truncated dome-shaped second guiding portion 34 toward the center passes the tapered portion 47 of the outlet side member 44 and flows out of the outlet 9.

The part of the fluid flowing through the hollow of the second internal structure 30 and the rest of the fluid flowing into the internal space of the outlet side member 44 joins together in the tapered portion 47, flows out through the outlet 9, and is discharged toward the grinding spot G through the nozzle 7. When the fluid is discharged through the nozzle 7, the many micro bubbles generated in the first bubble generating portion 24 and the second bubble generating portion 33 are exposed to atmospheric pressure. Then, the micro bubbles collide with the grinding blade 2 and the workpiece 3 and break, or explode and disappear. Vibration and shock generated during the extinction of the bubbles effectively remove sludge or chips generated at the grinding spot G. In other words, the cleaning effect around the grinding spot G is improved as the micro bubbles disappear. Further, due to the Coanda effect amplified by the first guiding portion 25 and the second guiding portion 34, the fluid discharged from the outlet 9 of the fluid supply pipe 10 adheres well to the surface of the blade or the workpiece. This increases the cooling effect by the fluid.

By providing the fluid supply unit of the machine tool with the fluid supply pipe 10 of the embodiment of the present invention, it is possible to cool the heat generated in the grinding blade and the workpiece more effectively than by using a conventional fluid supply unit. Further, the permeability and lubricity of the fluid are improved, thereby enhancing the precision of machining. Furthermore, by effectively removing the debris of the workpiece from the machining spot, it is possible to extend the service life of the tool such as the grinding blade and reduce the cost of replacing the tool.

In addition, since the fluid diffusing portion 21, the first swirl generating portion 22, the first bubble generating portion 24, and the first guiding portion 25 of the first internal structure 20 are formed by processing one member according to the present embodiment, the first internal structure 20 is manufactured as a single integrated component. Further, since the second swirl generating portion 31, the second bubble generating portion 33, and the second guiding portion 34 of the second internal structure 30 are formed by processing one member according to the present embodiment, the second internal structure 30 is manufactured as a single integrated component. Due to the above-described configuration and dimensional relationship, the first internal structure 20, the second internal structure 30, and the press plate 28 can be self-aligned. Therefore, it is possible to manufacture the fluid supply pipe 10 only by a simple process of housing the first internal structure 20 and the second internal structure 30 in the outlet side member 44 after inserting the first internal structure 20 into the hollow of the second internal structure 30, placing the press plate 28 at the head of the first internal structure 20, and then engaging the male screw 45 of the outer circumferential surface of the outlet side member 44 with the female screw 42 of the inner circumferential surface of the inlet side member 41. By this, it is easy to assemble the parts of the fluid supply pipe 10 and the time required to manufacture the fluid supply pipe 10 is reduced.

The fluid supply pipe of the present invention can be applied to a machining liquid supply unit in various machine tools such as the grinding machine, the cutting machine, and the drilling machine. In addition, the fluid supply pipe of the present invention can be effectively used in an apparatus for mixing two or more kinds of fluids (liquid and liquid, liquid and gas, gas and gas, or the like). For example, in the case of applying the fluid supply pipe of the present invention to a combustion engine, combustion efficiency can be improved by sufficiently mixing fuel and air. Further, in the case of applying the fluid supply pipe of the present invention to a cleaning apparatus, a cleaning effect can be further improved compared to a conventional cleaning apparatus.

Second Embodiment

Figure 9:
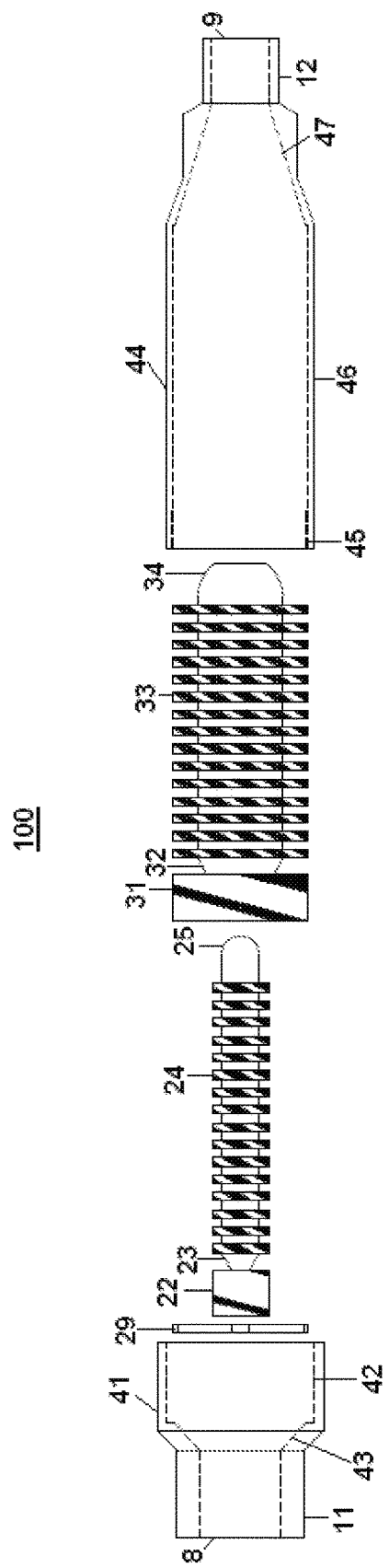
FIG. 9 is a side exploded view of a fluid supply pipe according to a second embodiment of the present invention.
Figure 10:
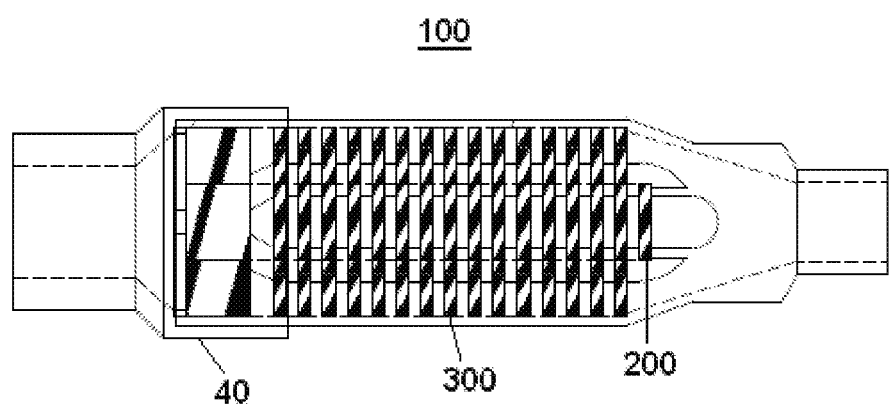
FIG. 10 is a side sectional view of the fluid supply pipe according to the second embodiment of the present invention.
Figure 11:
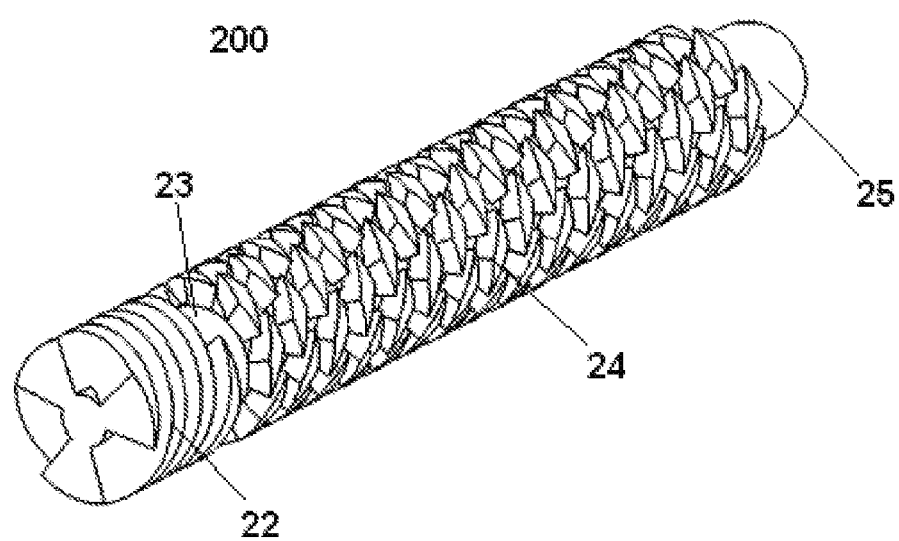
FIG. 11 is a three-dimensional view of a first internal structure of the fluid supply pipe according to the second embodiment of the present invention.
Figure 12:
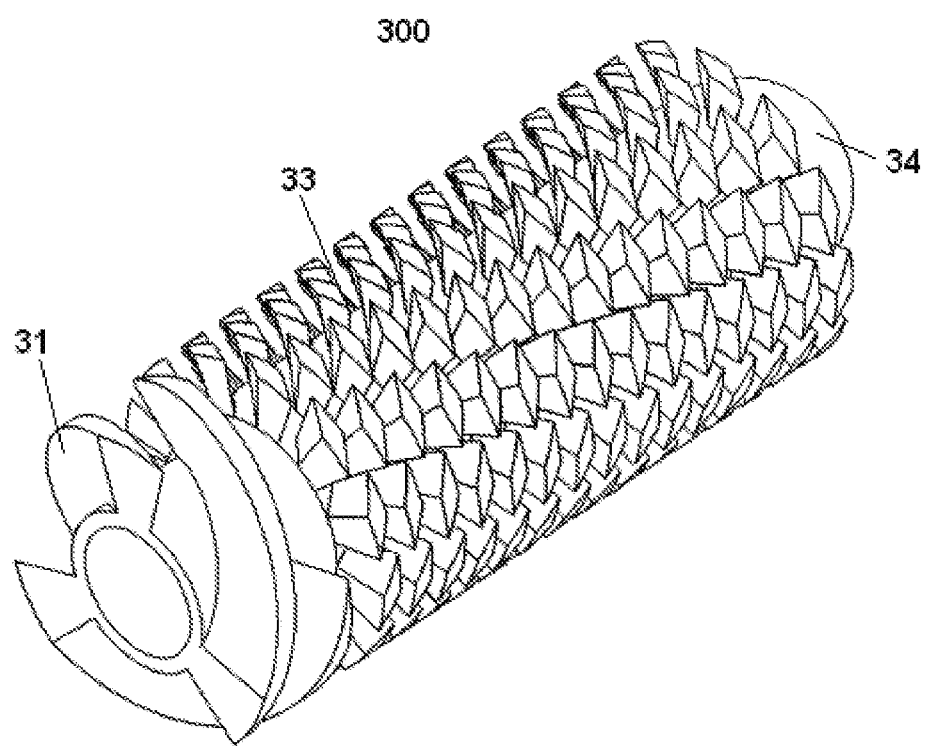
FIG. 12 is a three-dimensional view of a second internal structure of the fluid supply pipe according to the second embodiment of the present invention.
Figure 13:
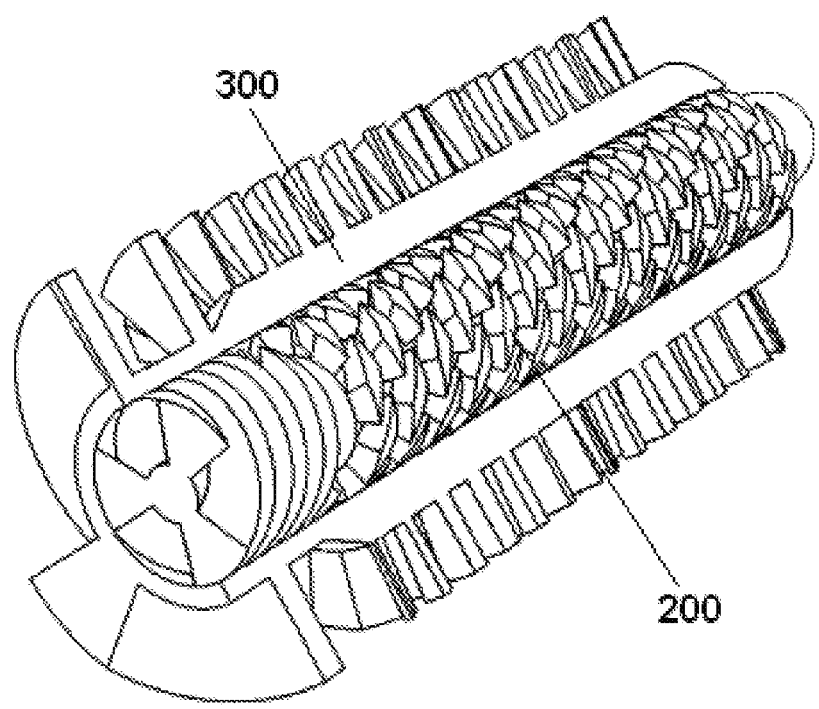
FIG. 13 is a three-dimensional perspective view showing a state in which the first internal structure is put in the hollow of the second internal structure according to the second embodiment of the present invention.

Referring to FIGS. 9 to 14, a fluid supply pipe 100 according to a second embodiment of the present invention will be described below. Descriptions of the same features as those of the first embodiment will be omitted, and only differences from the first embodiment will be described in detail. The same reference numerals are used for the same features as those of the first embodiment. FIG. 9 is a side exploded view of the fluid supply pipe 100 according to the second embodiment of the present invention, and FIG. 10 is a side sectional view of the fluid supply pipe 100. FIG. 11 is a three-dimensional view of a first internal structure 200 of the fluid supply pipe 100, FIG. 12 is a three-dimensional view of a second internal structure 300 of the fluid supply pipe 100, and FIG. 13 is a three-dimensional perspective view showing a state in which the first internal structure 200 is put in a hollow of the second internal structure 300. As shown in FIGS. 9 and 10, the fluid supply pipe 100 includes the first internal structure 200, the second internal structure 300, and the pipe body 40. Since the pipe body 40 of the second embodiment is the same as that of the first embodiment, descriptions thereof will be omitted. In FIGS. 9 and 10, a fluid flows from the inlet 8 to the outlet 9.

The first internal structure 200 of the second embodiment is formed by machining a cylindrical member made of a metal, for example, and includes the first swirl generating portion 22, the first bubble generating portion 24, and the first guiding portion 25 formed in the dome shape from the upstream side to the downstream side. Unlike the first embodiment, the first internal structure 200 of the second embodiment includes no fluid diffusing portion on its upstream end. Although the first guiding portion 25 has the dome shape in the present embodiment, the present invention is not limited thereto and the first guiding portion 25 may have a different shape. In a different embodiment, the first internal structure 200 does not include the first guiding portion 25.

As shown in FIGS. 9 and 12, the second internal structure 300 has the hollow shaft shape, and can be formed by processing a cylindrical member made of a metal such as steel, for example. The second internal structure 300 includes the second swirl generating portion 31, the second bubble generating portion 33, and the second guiding portion 34. Since the features of the second internal structure 300 are similar with those of the second internal structure 30 according to the first embodiment, they will not be described in detail. In the present embodiment, the second guiding portion 34 has the truncated dome shape. In other embodiments, the second guiding portion has a different shape (for example, a truncated cone shape).

Figure 14A:
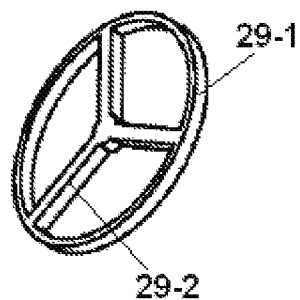
FIG. 14A is a three-dimensional view of a press plate according to the second embodiment of the present invention.
Figure 14B:
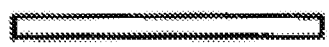
FIG. 14B is a side view of the press plate.
Figure 14C:
FIG. 14C is a top view of the press plate.

FIG. 14A is a three-dimensional view of a press plate 29 according to the second embodiment of the present invention, FIG. 14B is a side view of the press plate 29, and FIG. 14C is a top view of the press plate 29. As shown in FIGS. 14A to 14C, the press plate 29 includes a ring 29-1 and three supporting arms 29-2. As shown in FIG. 9, the outer diameter of the ring 29-1 is such that the ring 29-1 is close to the inner peripheral surface of the female screw 42 of the inlet side member 41. The press plate 29 is made of a metal such as steel or plastic, for example. While the press plate 28 according to the first embodiment has the two rings 28-1 and 28-2 such that the fluid diffusing portion 21 protrudes through the small ring 28-1, the press plate 29 of the present embodiment has the single ring 29-1 because the first internal structure 200 does not include the fluid diffusing portion.

The three supporting arms 29-2 of the press plate 29 prevents the first internal structure 200 from escaping from the pipe body 40 through the inlet 8. The fluid supply pipe 100 is assembled by housing the first internal structure 200 and the second internal structure 300 in the outlet side member 44 after inserting the first internal structure 200 into the hollow of the second internal structure 300, placing the press plate 29 at the head of the second internal structure 300, and then engaging the male screw 45 of the outer circumferential surface of the outlet side member 44 with the female screw 42 of the inner circumferential surface of the inlet side member 41. For this assembly, the first internal structure 200 cannot escape from the pipe body 40 through the inlet 8 by the press plate 29 and from the second internal structure 300 through an outlet of the hollow of the second internal structure 300 because the outlet's radius is smaller than the radius of an inlet of the hollow of the second internal structure 300. The press plate 29 keeps the first internal structure 200 confined in the hollow of the second internal structure 300. In the present embodiment, the inlet and the outlet of the hollow of the second internal structure 300 are circular. Further, the radius of the outlet of the hollow of the second internal structure 300 is smaller than the maximum distance from the center of the first bubble generating portion 24 of the first internal structure 200 to the end of each protrusion.

Hereinafter, flow of the fluid passing through the fluid supply pipe 100 will be described with reference to FIGS. 9 to 14. The fluid flowing into the fluid supply pipe 100 through the delivery pipe 6 (see FIG. 1) and the inlet 8 passes the internal space of the tapered portion 43 of the inlet side member 41. Then, through the spaces between the three supporting arms 29-2 of the press plate 29, a part of the fluid flows into the hollow of the second internal structure 300 in which the first internal structure 200 is housed and the rest flows into the internal space of the outlet side member 44 in which the second internal structure 300 is housed.

The fluid flowing into the hollow of the second internal structure 300 in which the first internal structure 200 is housed passes between the three vanes of the first swirl generating portion 22 formed in the spiral shape. The fluid vigorously swirls due to the vanes of the first swirl generating portion 22 and is sent to the first bubble generating portion 24. Then, the fluid passes the plurality of narrow flow paths formed by the plurality of rhombic protrusions formed regularly on the outer circumferential surface of the shaft portion of the first bubble generating portion 24. Due to the flip-flop phenomenon and the cavitation phenomenon caused by the first bubble generating portion 24, many minute vortices and micro bubbles are generated.

Then, the fluid flows toward the end of the first internal structure 200 after passing the first bubble generating portion 24. When the fluid flows from the plurality of narrow flow paths formed on the surface of the first bubble generating portion 24 toward the first guiding portion 25 formed in the end portion of the first internal structure 200, the flow path is rapidly expanded and the Coanda effect occurs. Due to the Coanda effect, the fluid is induced to flow along the surface of the first guiding portion 25. The fluid induced by the dome-shaped first guiding portion 25 toward the center passes the tapered portion 47 of the outlet side member 44 and flows out of the outlet 9.

The fluid flowing into the internal space of the outlet side member 44 in which the second internal structure 300 is housed passes between the three vanes of the second swirl generating portion 31 formed in the spiral shape in the counterclockwise direction. The fluid vigorously swirls due to the vanes of the second swirl generating portion 31 and is sent to the second bubble generating portion 33 past the tapered portion 32. As the fluid passes between the plurality of rhombic protrusions formed regularly on the outer circumferential surface of the shaft portion of the second bubble generating portion 33, a large number of micro bubbles are generated.

Then, the fluid flows toward the end of the second internal structure 300 after passing the second bubble generating portion 33. When the fluid flows from the plurality of narrow flow paths formed on the surface of the second bubble generating portion 33 toward the second guiding portion 34 formed in the end portion of the second internal structure 300, the flow path is rapidly expanded and the Coanda effect occurs. As described above, due to the Coanda effect, the fluid is induced to flow along the surface of the second guiding portion 34. The fluid induced by the truncated dome-shaped second guiding portion 34 toward the center passes the tapered portion 47 of the outlet side member 44 and flows out of the outlet 9. The part of the fluid flowing through the hollow of the second internal structure 300 and the rest of the fluid flowing into the internal space of the outlet side member 44 joins together in the tapered portion 47, flows out through the outlet 9, and is discharged toward the grinding spot G through the nozzle 7.

As described with respect to the first embodiment, the micro bubbles generated in the first bubble generating portion 24 of the first internal structure 200 and the second bubble generating portion 33 of the second internal structure 300 improves the cleaning effect around the grinding spot G. Further, due to the Coanda effect amplified by the first guiding portion 25 and the second guiding portion 34, the fluid discharged from the outlet 9 of the fluid supply pipe 100 adheres well to the surface of the blade or the workpiece. This increases the cooling effect by the fluid.

Third Embodiment

Figure 15:
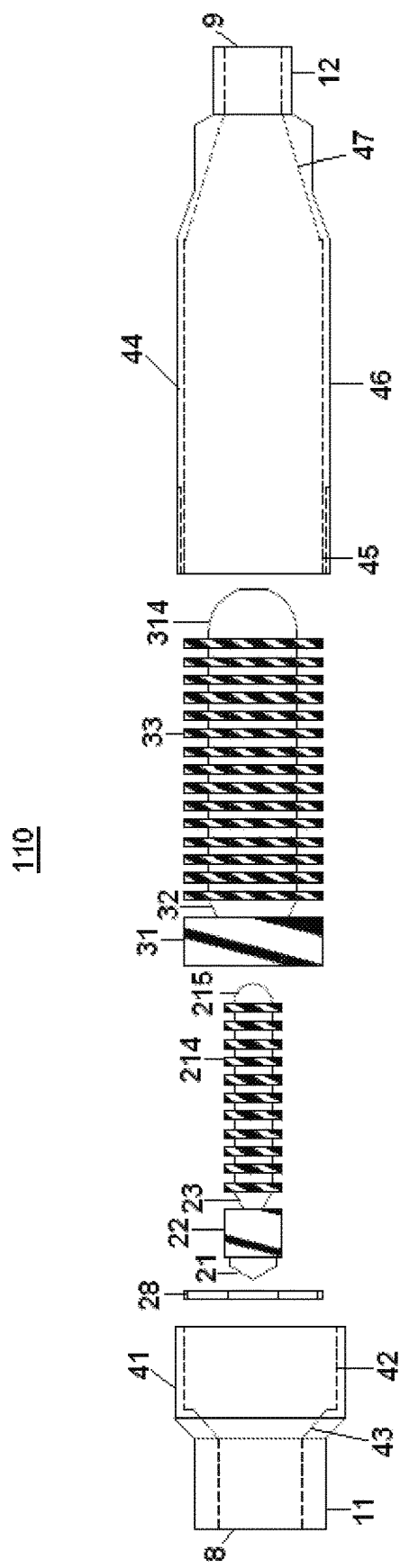
FIG. 15 is a side exploded view of a fluid supply pipe according to a third embodiment of the present invention.
Figure 16:
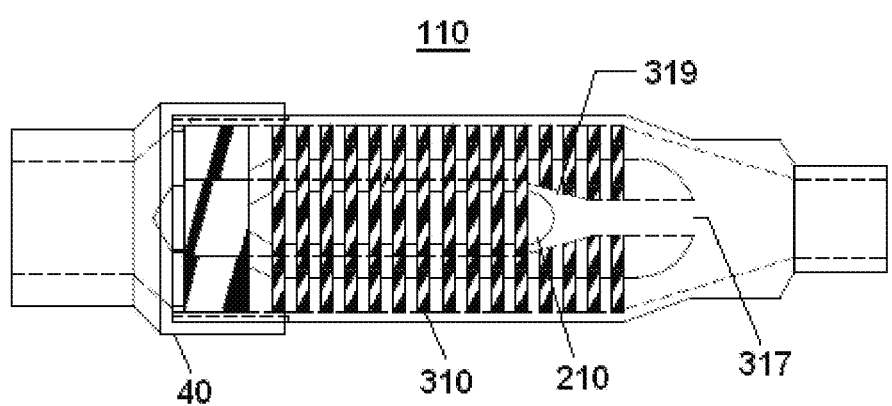
FIG. 16 is a side sectional view of the fluid supply pipe according to the third embodiment of the present invention.

Referring to FIGS. 15 and 16, a fluid supply pipe 110 according to a third embodiment of the present invention will be described below. Descriptions of the same features as those of the first and second embodiments will be omitted, and only differences from the first and second embodiments will be described in detail. The same reference numerals are used for the same features as those of the first and second embodiments. FIG. 15 is a side exploded view of the fluid supply pipe 110 according to the third embodiment of the present invention, and FIG. 16 is a side sectional view of the fluid supply pipe 110. As shown in FIGS. 15 and 16, the fluid supply pipe 110 includes a first internal structure 210, a second internal structure 310, and the pipe body 40. Since the pipe body 40 of the third embodiment is the same as that of the first embodiment, descriptions thereof will be omitted. In FIGS. 15 and 16, a fluid flows from the inlet 8 to the outlet 9.

The first internal structure 210 of the third embodiment is formed by machining a cylindrical member made of a metal, for example, and includes the fluid diffusing portion 21, the first swirl generating portion 22, a first bubble generating portion 214, and a dome-shaped first guiding portion 215 from the upstream side to the downstream side. Although the first bubble generating portion 214 is similar to the first bubble generating portion 24 of the first embodiment in terms of structure, the length of the first bubble generating portion 214 is relatively short compared to the length of the second internal structure 310. As described with respect to the first embodiment, the fluid diffusing portion 21 is formed by machining one end of the cylindrical member in the cone shape. However, the shape of the fluid diffusing portion 21 is not limited thereto. In a different embodiment, the fluid diffusing portion is formed in a dome shape. In the present embodiment, the first guiding portion 215 is formed in a dome shape. However, the present invention is not limited to this embodiment. In a different embodiment, the first guiding portion is formed in a different shape. In another embodiment, the first internal structure 210 does not include the first guiding portion.

According to the first embodiment, when the first internal structure 20 is housed in the second internal structure 30, the first guiding portion 25 of the first internal structure 20 protrudes out of the second internal structure 30 through the outlet 37 of the hollow of the second internal structure 30. For this, the full length of the first internal structure 20 is longed that the full length of the second internal structure 30 and the diameter of the outlet 37 of the second internal structure 30 is bigger than the maximum diameter of the first guiding portion 25. According to the third embodiment, the full length of the first internal structure 210 is shorter that the full length of the second internal structure 310 and the first guiding portion 215 of the first internal structure 210 does not protrude out of the second internal structure 310 through an outlet 317 of a hollow of the second internal structure 310 when the first internal structure 210 is housed in the second internal structure 310, as shown in FIGS. 15 and 16, unlike the first embodiment.

The second internal structure 310 has a hollow shaft shape, and can be formed by processing a cylindrical member made of a metal such as steel, for example. The second internal structure 310 includes the second swirl generating portion 31, the second bubble generating portion 33, and a second guiding portion 314 formed in a truncated dome shape, from the upstream side to the downstream side. As shown in FIG. 16, the hollow of the second internal structure 310 includes an inclined section 319 whose radius gradually decreases. This structure prevents the first internal structure 210 from escaping from the second internal structure 310 through the outlet 317 when the first internal structure 210 is housed in the second internal structure 310 and guides the fluid smoothly from the first guiding portion 215 toward the outlet 317 without hindering the flow of the fluid flowing through the hollow of the second internal structure 310. In the present embodiment, the inlet and the outlet of the hollow of the second internal structure 310 are circular, and the radius of the outlet of the hollow of the second internal structure 310 is smaller than the maximum distance from the center of the first bubble generating portion 214 of the first internal structure 210 to the end of each protrusion. Further, in the present embodiment, the diameter of the outlet 317 of the second internal structure 310 is smaller than the maximum diameter of the first guiding portion 215. However, the present invention is not limited to this embodiment.

The fluid supply pipe 110 is assembled by housing the first internal structure 210 and the second internal structure 310 in the outlet side member 44 after inserting the first internal structure 210 into the hollow of the second internal structure 310, placing the press plate 28 at the head of the second internal structure 310, and then engaging the male screw 45 of the outer circumferential surface of the outlet side member 44 with the female screw 42 of the inner circumferential surface of the inlet side member 41. For this assembly, the first internal structure 210 cannot escape from the pipe body 40 through the inlet 8 by the press plate 28.

Hereinafter, flow of the fluid passing through the fluid supply pipe 110 will be described with reference to FIGS. 15 to 16. The fluid flowing into the fluid supply pipe 110 through the delivery pipe 6 (see FIG. 1) and the inlet 8 bumps into the fluid diffusing portion 21 of the first internal structure 210 and diffuses outward radially from the center of the fluid supply pipe 110 while passing through the internal space of the tapered portion 43 of the inlet side member 41. Then, a part of the fluid flows into the hollow of the second internal structure 310 in which the first internal structure 210 is housed and the rest flows into the internal space of the outlet side member 44 in which the second internal structure 310 is housed.

The fluid flowing into the hollow of the second internal structure 310 in which the first internal structure 210 is housed passes between the three vanes of the first swirl generating portion 22 formed in the spiral shape. The fluid vigorously swirls due to the vanes of the first swirl generating portion 22 and is sent to the first bubble generating portion 214. Then, the fluid passes a plurality of narrow flow paths formed by a plurality of rhombic protrusions formed regularly on the outer circumferential surface of the shaft portion of the first bubble generating portion 214. Due to the flip-flop phenomenon and the cavitation phenomenon caused by the first bubble generating portion 214, many minute vortices and micro bubbles are generated.

Then, the fluid flows toward the end of the first internal structure 210 after passing the first bubble generating portion 214. Due to the Coanda effect, the fluid flows along the surface of the first guiding portion 215. The fluid induced by the first guiding portion 215 toward the center passes the inclined section 319 and flows out of the outlet 317 of the second internal structure 310.

The fluid flowing into the internal space of the outlet side member 44 in which the second internal structure 310 is housed passes between the three vanes of the second swirl generating portion 31 formed in the spiral shape. The fluid vigorously swirls due to the vanes of the second swirl generating portion 31 and is sent to the second bubble generating portion 33. Then, the fluid passes between the plurality of narrow flow paths formed by the plurality of rhombic protrusions formed regularly on the outer circumferential surface of the shaft portion of the second bubble generating portion 33. Due to the flip-flop phenomenon and the cavitation phenomenon caused by the second bubble generating portion 33, many minute vortices and micro bubbles are generated.

Then, the fluid flows toward the end of the second internal structure 310 after passing the second bubble generating portion 33. When the fluid flows from the plurality of narrow flow paths formed on the surface of the second bubble generating portion 33 toward the second guiding portion 314 formed in the end portion of the second internal structure 310, the flow path is rapidly expanded and the Coanda effect occurs. As described above, due to the Coanda effect, the fluid is induced to flow along the surface of the second guiding portion 314. The fluid induced by the second guiding portion 314 toward the center passes the tapered portion 47 of the outlet side member 44 and flows out of the outlet 9. The part of the fluid flowing through the hollow of the second internal structure 310 and the rest of the fluid flowing into the internal space of the outlet side member 44 joins together in the tapered portion 47, flows out through the outlet 9, and is discharged toward the grinding spot G through the nozzle 7.

Fourth Embodiment

Figure 17:
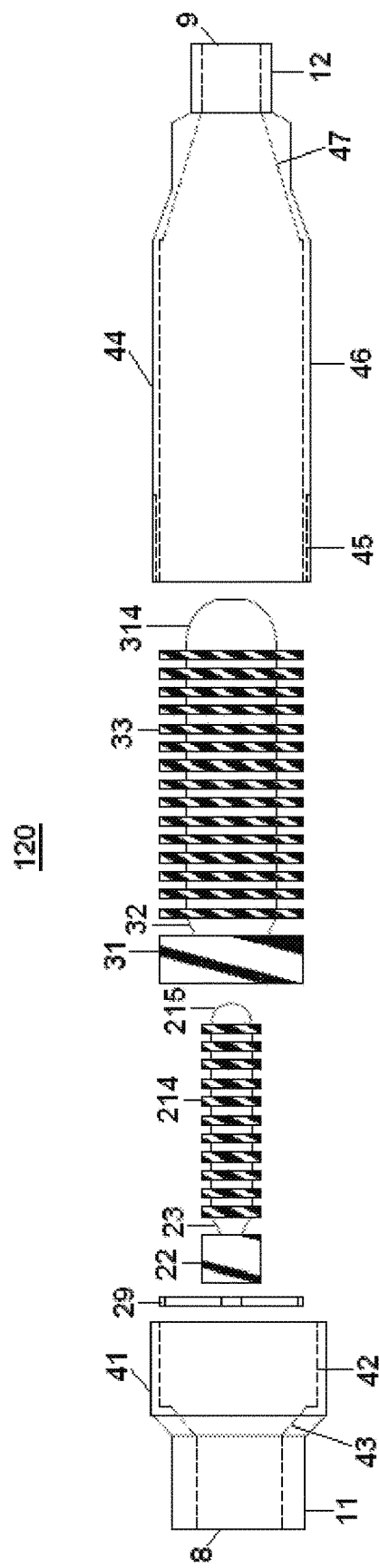
FIG. 17 is a side exploded view of a fluid supply pipe according to a fourth embodiment of the present invention.
Figure 18:
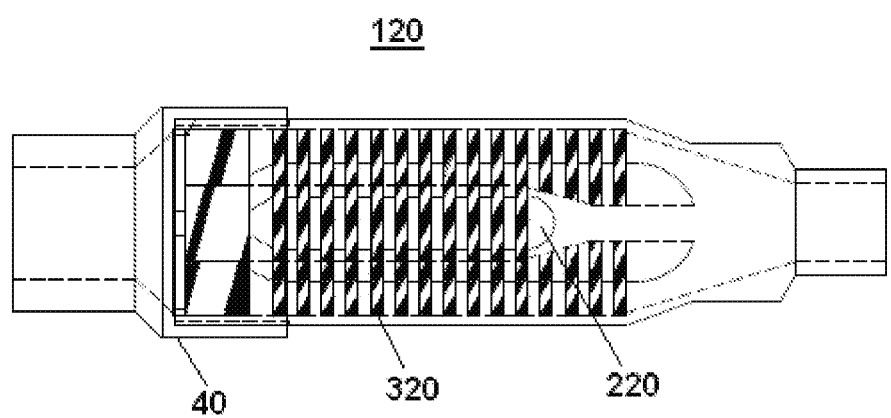
FIG. 18 is a side sectional view of the fluid supply pipe according to the fourth embodiment of the present invention.

Referring to FIGS. 17 and 18, a fluid supply pipe 120 according to a fourth embodiment of the present invention will be described below. Descriptions of the same features as those of the first embodiment and the third embodiment will be omitted, and only differences from the embodiments will be described in detail. The same reference numerals are used for the same features as those of the first and third embodiments. FIG. 17 is a side exploded view of the fluid supply pipe 120 according to the fourth embodiment of the present invention, and FIG. 18 is a side sectional view of the fluid supply pipe 120. As shown in FIGS. 17 and 18, the fluid supply pipe 120 includes a first internal structure 220, a second internal structure 320, and the pipe body 40. Since the pipe body 40 of the fourth embodiment is the same as that of the first embodiment, descriptions thereof will be omitted. Further, since the second internal structure 320 of the fourth embodiment has the same features as the second internal structure 310 of the third embodiment, the second internal structure 320 will not described in detail. In FIGS. 17 and 18, a fluid flows from the inlet 8 to the outlet 9.

The first internal structure 220 of the fourth embodiment includes the first swirl generating portion 22, the first bubble generating portion 214, and the first guiding portion 215 from the upstream side to the downstream side. While the first internal structure 210 according to the third embodiment includes the fluid diffusing portion 21 formed in the cone shape in the front end, the first internal structure 220 according to the fourth embodiment includes no fluid diffusing portion in the front end. Thus, the press plate 29 consisting of one ring and three supporting arms is used in the fourth embodiment.

The fluid flowing into the fluid supply pipe 120 through the inlet 8 passes the internal space of the tapered portion 43 of the inlet side member 41. Then, through the spaces between the three supporting arms 29-2 of the press plate 29, a part of the fluid flows into a hollow of the second internal structure 320 in which the first internal structure 220 is housed and the rest flows into the internal space of the outlet side member 44 in which the second internal structure 320 is housed. Since the flow in the hollow of the second internal structure 320 and the flow in the internal space of the outlet side member 44 are similar to those of the third embodiment, they will not be described in detail.

Fifth Embodiment

Figure 19:
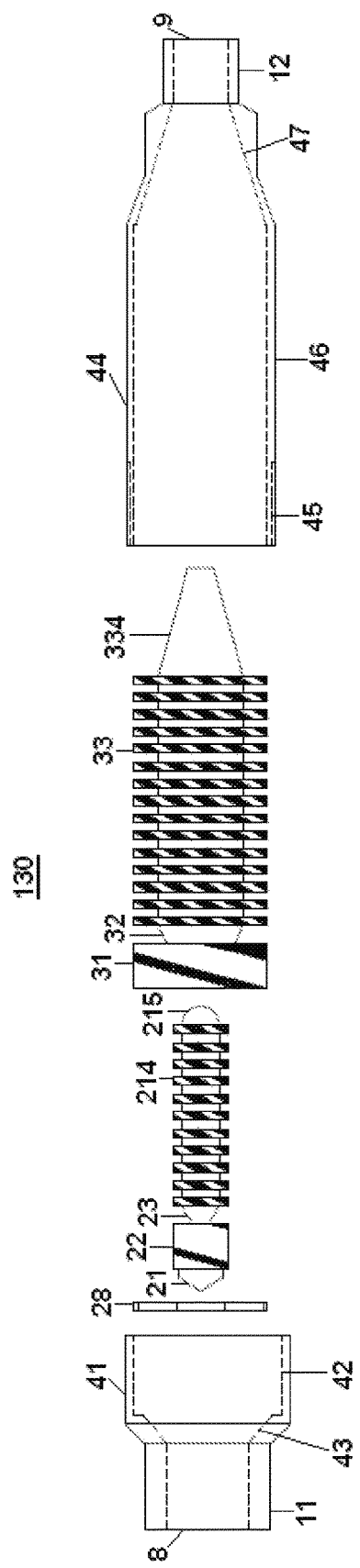
FIG. 19 is a side exploded view of a fluid supply pipe according to a fifth embodiment of the present invention.
Figure 20:
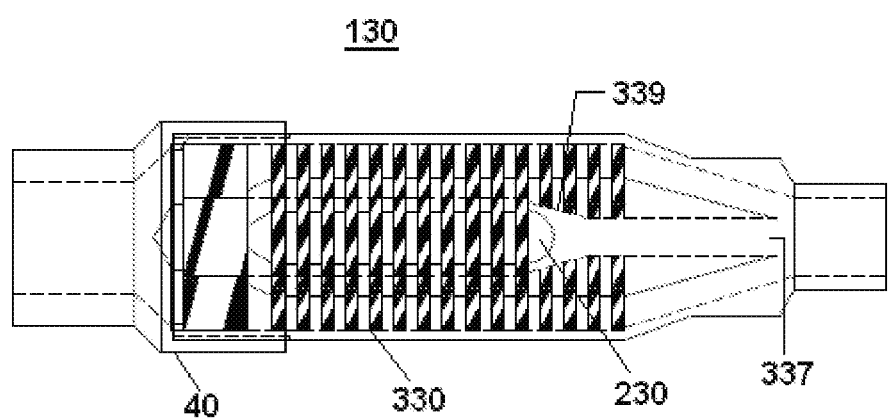
FIG. 20 is a side sectional view of the fluid supply pipe according to the fifth embodiment of the present invention.

Referring to FIGS. 19 and 20, a fluid supply pipe 130 according to a fifth embodiment of the present invention will be described below. Descriptions of the same features as those of the first and third embodiments will be omitted, and the same reference numerals are used for the same features as those of the first and third embodiments. FIG. 19 is a side exploded view of the fluid supply pipe 130 according to the fifth embodiment of the present invention, and FIG. 20 is a side sectional view of the fluid supply pipe 130. As shown in FIGS. 19 and 20, the fluid supply pipe 130 includes a first internal structure 230, a second internal structure 330, and the pipe body 40. Since the pipe body 40 of the fifth embodiment is the same as that of the first embodiment, descriptions thereof will be omitted. Further, since the first internal structure 230 of the fifth embodiment has the same features as the first internal structure 210 of the third embodiment, the first internal structure 230 will not described in detail. In FIGS. 19 and 20, a fluid flows from the inlet 8 to the outlet 9.

Similarly to the third and fourth embodiments, the full length of the first internal structure 230 is shorter than the full length of second internal structure 330 and the first guiding portion 215 of the first internal structure 230 does not protrude out of the second internal structure 330 through an outlet 337 of the second internal structure 330 when the first internal structure 230 is housed in the second internal structure 330. The second internal structure 330 according to the fifth embodiment has a hollow shaft shape, and can be formed by processing a cylindrical member made of a metal such as steel, for example. The second internal structure 330 includes the second swirl generating portion 31, the second bubble generating portion 33, and a second guiding portion 334 formed in a truncated cone shape from the upstream side to the downstream side. As shown in FIG. 20, the hollow of the second internal structure 330 includes an inclined section 339 whose radius gradually decreases. This structure prevents the first internal structure 230 from escaping from the second internal structure 330 through the outlet 337 when the first internal structure 230 is housed in the second internal structure 330 and guides the fluid smoothly from the first guiding portion 215 toward the outlet 337 without hindering the flow of the fluid flowing through the hollow of the second internal structure 330. In the present embodiment, the inlet and the outlet of the hollow of the second internal structure 330 are circular, and the radius of the outlet of the hollow of the second internal structure 330 is smaller than the maximum distance from the center of the first bubble generating portion 214 of the first internal structure 230 to the end of each protrusion. Further, in the present embodiment, the diameter of the outlet 337 of the second internal structure 330 is smaller than the maximum diameter of the first guiding portion 215. However, the present invention is not limited to this embodiment.

The fluid supply pipe 130 is assembled by housing the first internal structure 230 and the second internal structure 330 in the outlet side member 44 after inserting the first internal structure 230 into the hollow of the second internal structure 330, placing the press plate 28 at the head of the second internal structure 330, and then engaging the male screw 45 of the outer circumferential surface of the outlet side member 44 with the female screw 42 of the inner circumferential surface of the inlet side member 41. For this assembly, the first internal structure 230 cannot escape from the pipe body 40 through the inlet 8 by the press plate 28.

The fluid flowing into the fluid supply pipe 130 through the delivery pipe 6 (see FIG. 1) and the inlet 8 bumps into the fluid diffusing portion 21 of the first internal structure 230 and diffuses outward radially from the center of the fluid supply pipe 110 while passing through the internal space of the tapered portion 43 of the inlet side member 41. Then, a part of the fluid flows into the hollow of the second internal structure 330 in which the first internal structure 230 is housed and the rest flows into the internal space of the outlet side member 44 in which the second internal structure 330 is housed.

The fluid flowing into the hollow of the second internal structure 330 in which the first internal structure 230 is housed passes between the three vanes of the first swirl generating portion 22 formed in the spiral shape. The fluid vigorously swirls due to the vanes of the first swirl generating portion 22 and is sent to the first bubble generating portion 214. Then, the fluid passes the plurality of narrow flow paths formed by the plurality of rhombic protrusions formed regularly on the outer circumferential surface of the shaft portion of the first bubble generating portion 214. Due to the flip-flop phenomenon and the cavitation phenomenon caused by the first bubble generating portion 214, many minute vortices and micro bubbles are generated. Then, the fluid flows toward the end of the first internal structure 230 after passing the first bubble generating portion 214. Due to the Coanda effect, the fluid flows along the surface of the first guiding portion 215. The fluid induced by the first guiding portion 215 toward the center passes the inclined section 339 and flows out of the outlet 337 of the second internal structure 330.

The fluid flowing into the internal space of the outlet side member 44 in which the second internal structure 330 is housed passes between the three vanes of the second swirl generating portion 31 formed in the spiral shape. The fluid vigorously swirls due to the vanes of the second swirl generating portion 31 and is sent to the second bubble generating portion 33. Then, due to the structure of the second bubble generating portion 33, many minute vortices and micro bubbles are generated. After passing the second bubble generating portion 33, the fluid is induced to flow along the surface of the second guiding portion 334 formed in the truncated cone shape. The fluid induced by the second guiding portion 334 toward the center passes the tapered portion 47 of the outlet side member 44 and flows out of the outlet 9. The part of the fluid flowing through the hollow of the second internal structure 330 and the rest of the fluid flowing into the internal space of the outlet side member 44 joins together in the tapered portion 47, flows out through the outlet 9, and is discharged toward the grinding spot G through the nozzle 7.

Sixth Embodiment

Figure 21:
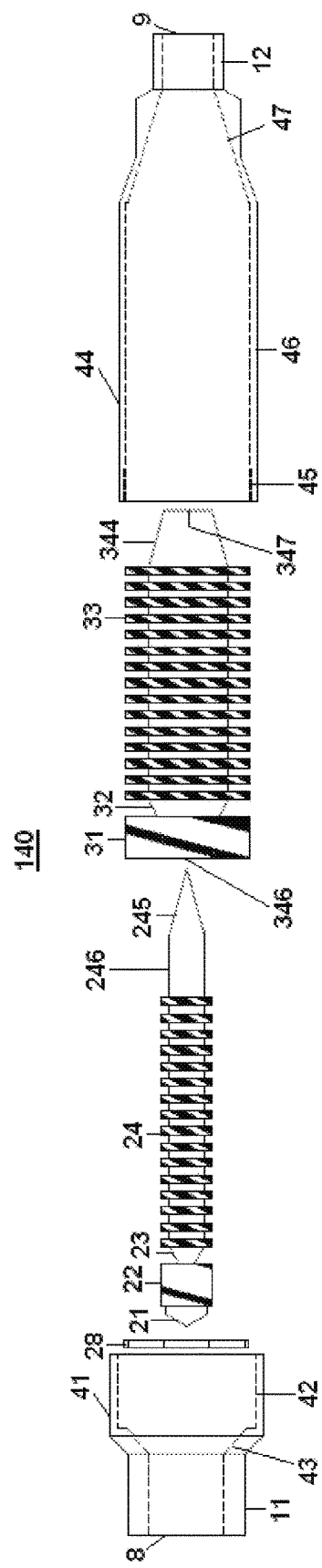
FIG. 21 is a side exploded view of a fluid supply pipe according to a sixth embodiment of the present invention.
Figure 22:
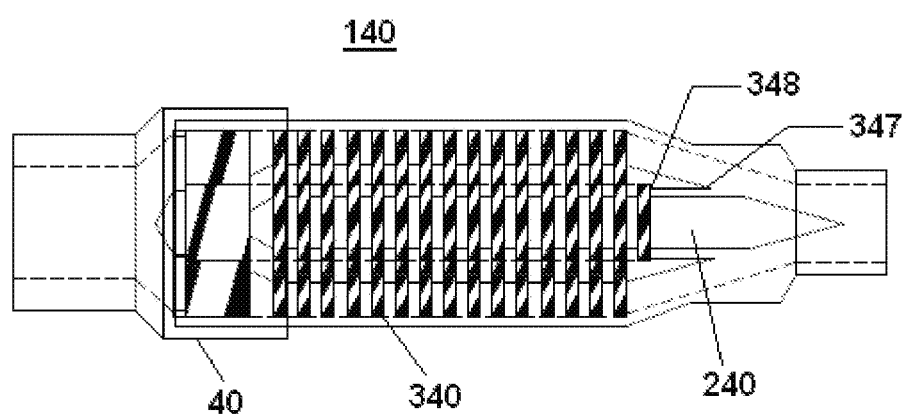
FIG. 22 is a side sectional view of the fluid supply pipe according to the sixth embodiment of the present invention.

Referring to FIGS. 21 and 22, a fluid supply pipe 140 according to a sixth embodiment of the present invention will be described below. Descriptions of the same features as those of the first embodiment will be omitted, and the same reference numerals are used for the same features as those of the first embodiment. FIG. 21 is a side exploded view of the fluid supply pipe 140 according to the sixth embodiment of the present invention, and FIG. 22 is a side sectional view of the fluid supply pipe 140. As shown in FIGS. 21 and 22, the fluid supply pipe 140 includes a first internal structure 240, a second internal structure 340, and the pipe body 40. Since the pipe body 40 of the sixth embodiment is the same as that of the first embodiment, descriptions thereof will be omitted. In FIGS. 21 and 22, a fluid flows from the inlet 8 to the outlet 9.

The first internal structure 240 of the sixth embodiment is formed by machining a cylindrical member made of a metal, for example, and includes the fluid diffusing portion 21, the first swirl generating portion 22, the bubble generating portion 24, and a first guiding portion 245 formed in a cone shape from the upstream side to the downstream side. The fluid diffusing portion 21 has a different shape, for example, a done shape. As shown in FIG. 21, the shaft portion of the first bubble generating portion 24 is extended between the first bubble generating portion 24 and the first guiding portion 245. In the present embodiment, the length of the shaft extension portion 246 is determined such that first guiding portion 245 of the first internal structure 240 protrudes out of the second internal structure 340 through an outlet 347 of the second internal structure 340 when the first internal structure 240 is housed in a hollow of the second internal structure 340, as shown in FIG. 22.

The second internal structure 340 has a hollow shaft shape and is formed by processing a cylindrical member made of a metal such as steel, for example. The second internal structure 340 includes the second swirl generating portion 31, the second bubble generating portion 33, and a second guiding portion 344 from the upstream side to the downstream side. The second guiding portion 344 is formed in a truncated cone shape. The inner diameter of the second internal structure 340 (i.e. the diameter of the hollow) is bigger on its inlet 346 side than on its outlet 347 side.

In the present embodiment, the inner diameter of the hollow of the second internal structure 340 is uniform from the inlet 346 to a region in which the first bubble generating portion 24 of the first internal structure 240 is housed and is smaller in the further downstream area. By this, it is possible to house the first internal structure 240 in the hollow of the second internal structure 340 through the inlet 346 of the second internal structure 340 and to prevent the first internal structure 240 from escaping to the outside of the second internal structure 340 through the outlet 347. The size of the outlet 347 of the second internal structure 340 is bigger than the maximum area of the first guiding portion 245 of the first internal structure 240 (i.e. the area of the shaft extension portion 246). In the present embodiment, the inlet and the outlet of the hollow of the second internal structure 340 are circular, and the radius of the outlet of the hollow of the second internal structure 340 is smaller than the maximum distance from the center of the first bubble generating portion 24 of the first internal structure 240 to the end of each protrusion. The length of the second guiding portion 344 is determined based on the dimension of the first guiding portion 245 of the first internal structure 240.

Seventh Embodiment

Figure 23:
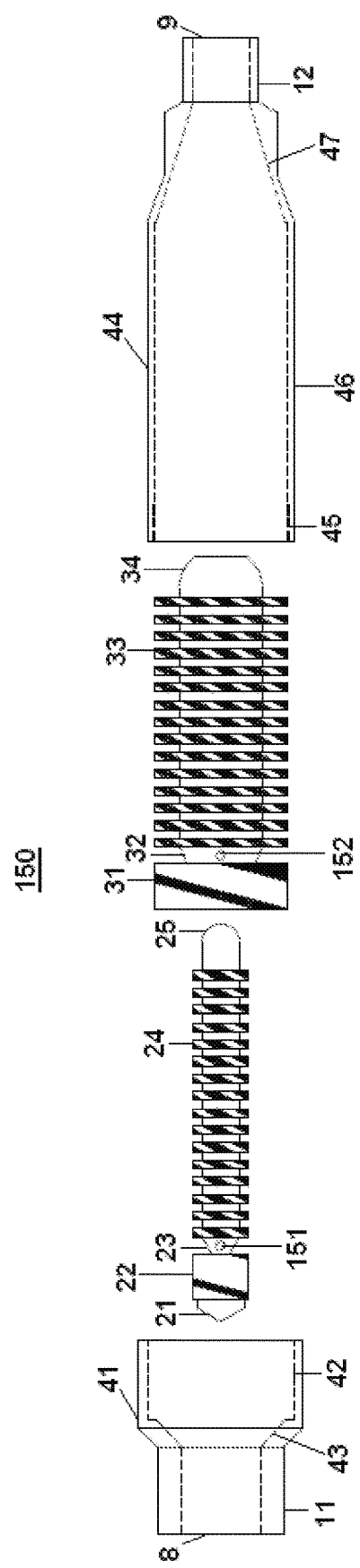
FIG. 23 is a side exploded view of a fluid supply pipe according to a seventh embodiment of the present invention.
Figure 24:
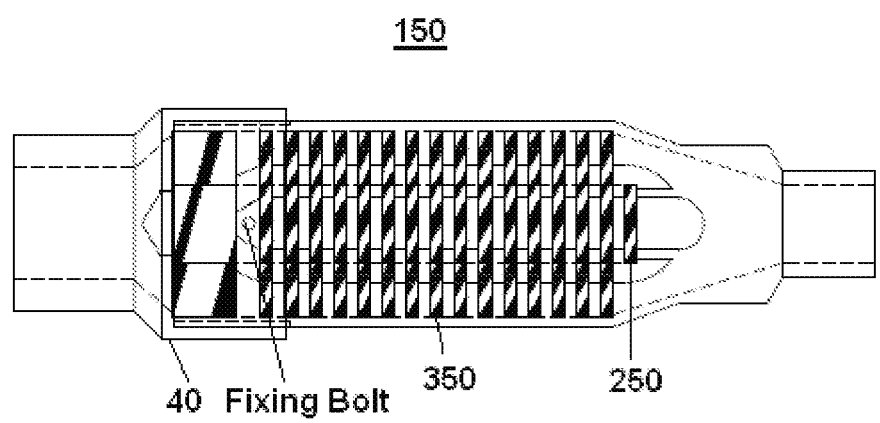
FIG. 24 is a side sectional view of the fluid supply pipe according to the seventh embodiment of the present invention.

Referring to FIGS. 23 and 24, a fluid supply pipe 150 according to a seventh embodiment of the present invention will be described below. Descriptions of the same features as those of the first embodiment will be omitted, and the same reference numerals are used for the same features as those of the first embodiment. FIG. 23 is a side exploded view of the fluid supply pipe 150 according to the seventh embodiment of the present invention, and FIG. 24 is a side sectional view of the fluid supply pipe 150. As shown in FIGS. 23 and 24, the fluid supply pipe 150 includes a first internal structure 250, a second internal structure 350, and the pipe body 40. Since the pipe body 40 of the seventh embodiment is the same as that of the first embodiment, descriptions thereof will be omitted. In FIGS. 23 and 24, a fluid flows from the inlet 8 to the outlet 9.

Similarly to the first internal structure 20 of the first embodiment, the first internal structure 250 of the seventh embodiment includes the fluid diffusing portion 21, the first swirl generating portion 22, the bubble generating portion 24, and the first guiding portion 25 formed in the dome shape. Similarly to the second internal structure 30 of the first embodiment, the second internal structure 350 has a hollow shaft shape and includes the second swirl generating portion 31, the second bubble generating portion 33, and the second guiding portion 34 formed in the truncated dome shape. Further, as shown in FIG. 23, the first internal structure 250 includes a bolt hole 151 and the second internal structure 350 includes a bolt hole 152. The bolt holes 151 and 152 are formed at positions matching each other so that the first internal structure 250 and the second internal structure 350 can be fixed by one fixing bolt when the first internal structure 250 is put in the hollow of the second internal structure 350.

The fluid supply pipe 150 is manufactured, for example, by assembly as described below. First, the first internal structure 250 is put in the hollow of the second internal structure 350. After fixing the first internal structure 250 to the second internal structure 350 by inserting the fixing bolt in the bolt holes 152 and 151, the first internal structure 250 and the second internal structure 350 are housed in the outlet side member 44. Then, the male screw 45 of the outer circumferential surface of the outlet side member 44 is engaged with the female screw 42 of the inner circumferential surface of the inlet side member 41.

Since the first internal structure 250 is fixed to the second internal structure 350 by using the fixing bolt, it is possible to prevent the first internal structure 250 from escaping from the pipe body 40 to the outside without using the press plate 28 or 29. In the second to sixth embodiments and other embodiments, the fixing bolt may be used instead of the press plate 28 or 29. The flow of the fluid in the fluid supply pipe 150 is the same as that described in the first embodiment. The fixing of the first internal structure 250 and the second internal structure 350 is not limited to the above-described bolt coupling, and any method for coupling mechanical components known in the art is applicable.

Eighth Embodiment

Figure 25:
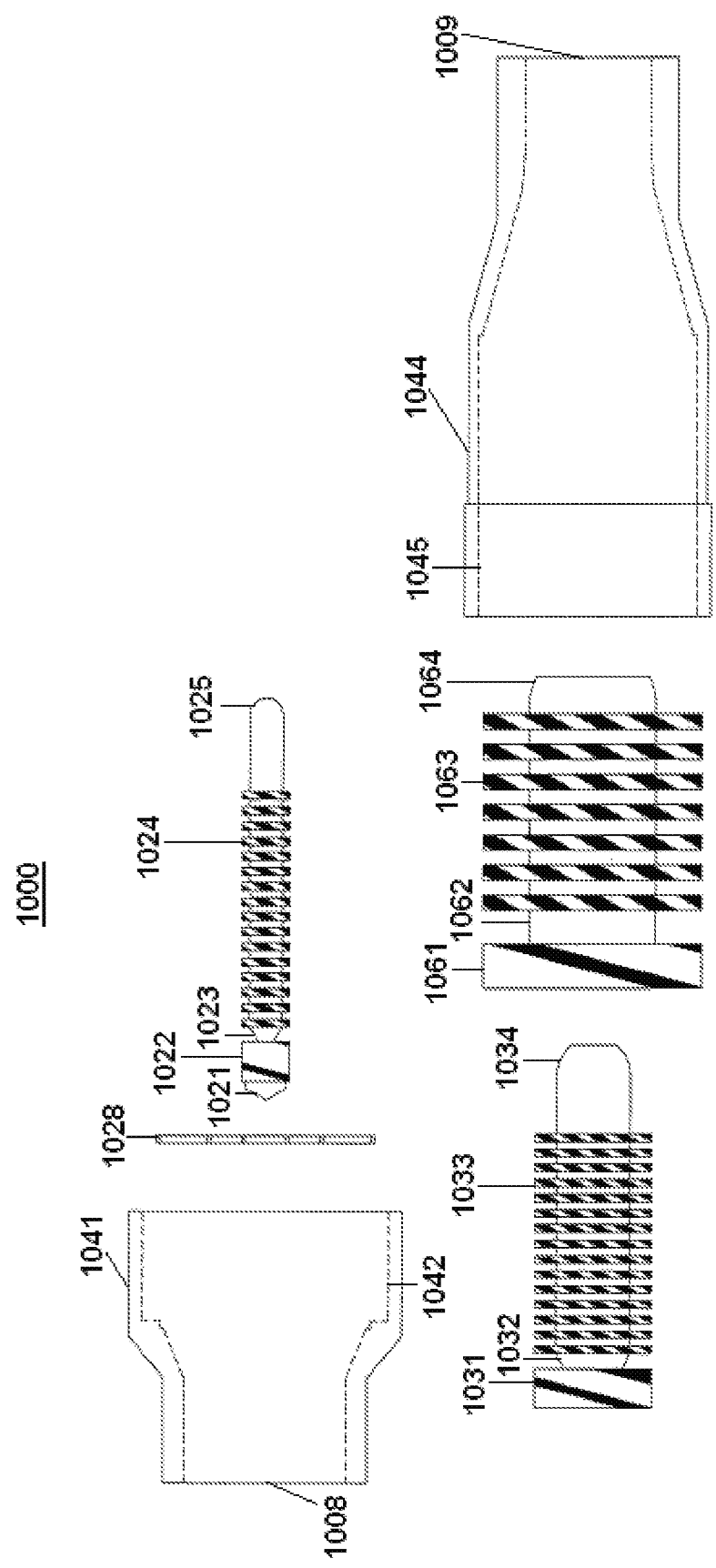
FIG. 25 is a side exploded view of a fluid supply pipe according to an eighth embodiment of the present invention.
Figure 26:
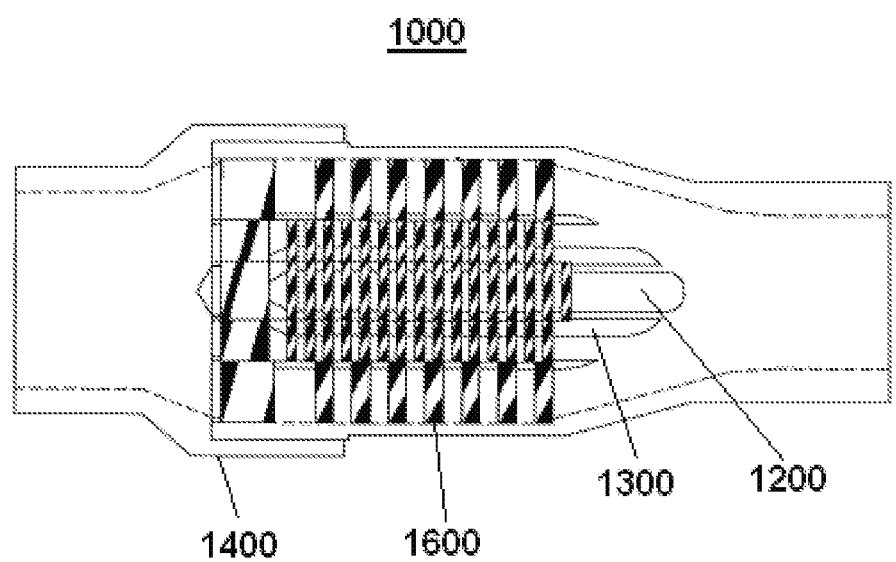
FIG. 26 is a side sectional view of the fluid supply pipe according to the eighth embodiment of the present invention.

Referring to FIGS. 25 and 26, a fluid supply pipe 1000 according to an eighth embodiment of the present invention will be described below. FIG. 25 is a side exploded view of the fluid supply pipe 1000 according to the eighth embodiment of the present invention, and FIG. 26 is a side sectional view of the fluid supply pipe 1000. As shown in FIGS. 25 and 26, the fluid supply pipe 1000 includes a first internal structure 1200, a second internal structure 1300, a third internal structure 1600, and a pipe body 1400. In FIGS. 25 and 26, a fluid flows from an inlet 1008 to an outlet 1009.

The pipe body 1400 includes an inlet side member 1041 and an outlet side member 1044. Since the inlet side member 1041 and the outlet side member 1044 are similar to the inlet side member 41 and the outlet side member 44 of the first embodiment, respectively, they will not be described in detail. The fluid supply pipe 1000 includes the third internal structure 1600 which is formed in a hollow tube shape and is housed in the pipe body 1400, the second internal structure 1300 which is formed in a hollow tube shape and is housed in the hollow of the third internal structure 1600, and the first internal structure 1200 which is housed in the hollow of the second internal structure 1300.

The fluid supply pipe 1000 is manufactured, for example, by assembly as described below. First, the second internal structure 1300 is put in the hollow of the third internal structure 1600 and the first internal structure 1200 is put in the hollow of the second internal structure 1300. Then, the first to third internal structures 1200, 1300 and 1600 are housed in the outlet side member 1044. After placing a press plate 1028 at the head of the third internal structure 1600, a male screw 1045 of the outer circumferential surface of the outlet side member 1044 is engaged with a female screw 1042 of the inner circumferential surface of the inlet side member 1041. The connection of the inlet side member 1041 and the outlet side member 1044 is not limited to the screw-joining and any method for connecting mechanical components known in the art is applicable. Further, the shapes of the inlet side member 1041 and the outlet side member 1044 are not limited to ones shown in FIGS. 25 and 26. A designer of the fluid supply pipe 1000 may arbitrarily design them or change the shapes according to applications of the fluid supply pipe 1000. Each of the inlet side member 1041 and the outlet side member 1044 can be made of a metal such as steel, plastic, or the like.

The first internal structure 1200 is formed by processing a cylindrical member made of a metal such as steel or by molding plastic, for example. The first internal structure 1200 includes a fluid diffusing portion 1021, a first swirl generating portion 1022, a first bubble generating portion 1024, and a first guiding portion 1025 from the upstream side to the downstream side. The fluid diffusing portion 1021, the first swirl generating portion 1022, the first bubble generating portion 1024, and the first guiding portion 1025 have similar structures to the fluid diffusing portion 21, the first swirl generating portion 22, the first bubble generating portion 24, and the first guiding portion 25 of the first embodiment, respectively. Thus, they will not be described in detail. In the present embodiment, the fluid diffusing portion 1021 is formed in a cone shape. However, the present invention is not limited thereto and the fluid diffusing portion may have a different shape. In an embodiment, the fluid diffusing portion is formed in a dome shape. In another embodiment, the first internal structure 1200 includes no fluid diffusing portion.

The second internal structure 1300 is formed in the hollow tube shape, and is formed by processing a cylindrical member made of a metal such as steel or by molding plastic, for example. The second internal structure 1300 includes a second swirl generating portion 1031, a second bubble generating portion 1033, and a second guiding portion 1034 from the upstream side to the downstream side. The second swirl generating portion 1031, the second bubble generating portion 1033, and the second guiding portion 1034 have similar structures to the second swirl generating portion 31, the second bubble generating portion 33, and the second guiding portion 34 of the first embodiment, respectively. Thus, they will not be described in detail. The inner diameter of the second internal structure 1300 (in other words, the diameter of the hollow of the second internal structure 1300) is bigger on the side of its inlet than on the side of its outlet. Due to the difference between the inner diameter on the inlet side and the inner diameter on the outlet side, a step or an inclined section is formed between a region having a large inner diameter and a region having a small inner diameter in the hollow of the second internal structure 1300. Further, as shown in FIG. 26, the first internal structure 1200 is inserted through the inlet of the hollow of the second internal structure 1300 and the first guiding portion 1025 of the first internal structure 1200 protrudes out of the second internal structure 1300 through the outlet of hollow of the second internal structure 1300. In the present embodiment, the inlet and the outlet of the hollow of the second internal structure 1300 are circular. Further, the radius of the outlet of the hollow of the second internal structure 1300 is smaller than the maximum distance from the center of the first bubble generating portion 1024 of the first internal structure 1200 to the end of each protrusion.

The third internal structure 1600 is formed in the hollow tube shape, and is formed by processing a cylindrical member made of a metal such as steel or by molding plastic, for example. The third internal structure 1600 includes a third swirl generating portion 1061, a third bubble generating portion 1063, and a third guiding portion 1064 from the upstream side to the downstream side. The third swirl generating portion 1061, the third bubble generating portion 1063, and the third guiding portion 1064 have similar structures to the second swirl generating portion 31, the second bubble generating portion 33, and the second guiding portion 34 of the first embodiment, respectively. Thus, they will not be described in detail. The third swirl generating portion 1061 corresponds to a part or the whole of the head portion of the third internal structure 1600, and the third bubble generating portion 1063 corresponds to a part or the whole of the body portion of the third internal structure 1600. The inner diameter of the third internal structure 1600

(in other words, the diameter of the hollow of the third internal structure 1600) is bigger on the side of its inlet than on the side of its outlet. Due to the difference between the inner diameter on the inlet side and the inner diameter on the outlet side, a step or an inclined section is formed between a region having a large inner diameter and a region having a small inner diameter in the hollow of the third internal structure 1600. Further, as shown in FIG. 26, the second internal structure 1300 is inserted through the inlet of the hollow of the third internal structure 1600 and the second guiding portion 1034 of the second internal structure 1300 protrudes out of the third internal structure 1600 through the outlet of hollow of the third internal structure 1600. Further, in the present embodiment, the inlet and the outlet of the hollow of the third internal structure 1600 are circular, and the radius of the outlet of the hollow of the third internal structure 1600 is smaller than the maximum distance from the center of the first bubble generating portion 1033 of the second internal structure 1300 to the end of each protrusion.

The press plate 1028 has a similar structure to the press plate 28 of the first embodiment. The press plate 1028 includes three concentric rings having different radii and supporting arms connecting each ring to each other. The radius of the smallest ring is bigger than the maximum radius of the fluid diffusing portion 1021 of the first internal structure 1200 and smaller than the maximum radius of the first swirl generating portion 1022 (i.e. the distance from the center of the shaft portion to the end of each vane of the first swirl generating portion 1022). The radius of the middle-size ring is bigger than the maximum radius of the first swirl generating portion 1022 (i.e. the distance from the center of the shaft portion to the end of each vane of the first swirl generating portion 1022) and smaller than the maximum radius of the second swirl generating portion 1031 (i.e. the distance from the center of the shaft portion to the end of each vane of the second swirl generating portion 1031). The outer diameter of the biggest ring is such that it is close to the inner peripheral surface of the female screw 1042 of the inlet side member 1041. By these dimensional relationships, the press plate 1028 prevents the first internal structure 1200 and the second internal structure 1300 from escaping from the pipe body 1400 through the inlet 1008 of the pipe body 1400. The press plate 1028 is made of a metal such as steel or plastic, for example. The structure of the press plate 1028 is not limited thereto. In a different embodiment, the press plate includes two concentric rings and supporting arms connecting the two rings.

The fluid flowing into the fluid supply pipe 1000 through the inlet 1008 bumps into the fluid diffusing portion 1021 and diffuses outward radially from the center of the fluid supply pipe 1000. The fluid flowing into the fluid supply pipe 1000 is divided into three flows: a part flows into the hollow of the second internal structure 1300, a part of the fluid flows into the hollow of the third internal structure 1600, and the rest flows into the internal space of the outlet side member 1044. While the fluid flowing into the hollow of the second internal structure 1300 passes the first bubble generating portion 1024, micro bubbles are generated. While the fluid flowing into the hollow of the third internal structure 1600 passes the second bubble generating portion 1033, micro bubbles are generated. Further, while the fluid flowing into the internal space of the outlet side member 1044 passes the third generating portion 1063, micro bubbles are generated. As described above, the fluid supply pipe 1000 is configured such that the fluid flowing into the fluid supply pipe 1000 is divided into three flows and passes the three bubble generating portions. Thus, a large number of micro bubbles are generated. The micro bubbles improve the cleaning effect around a grinding spot.

The configurations of the first internal structure 1200, the second internal structure 1300, and the third internal structure 1600 are not limited to the present embodiment. For example, at least one of the first to third internal structures may have the configuration of the first internal structure or the second internal structure described in at least one of the second to seventh embodiments. More specifically, although the first internal structure 1200 includes the fluid diffusing portion 1021 in the present embodiment, the present invention is not limited to this embodiment. In a different embodiment, the first internal structure 1200 includes no fluid diffusing portion similarly to the second embodiment. In this embodiment, the press plate 29 may be used instead of the press plate 1028. Alternately, the first internal structure 1200, the second internal structure 1300, and the third internal structure 1600 may be fixed to each other by a fixing bolt without using the press plate.

Further, in the present embodiment, the first internal structure 1200 includes the first guiding portion 1025 formed in a dome shape. However, the present invention is not limited to this embodiment and the first guiding portion may have a different shape. In a different embodiment, the first guiding portion is formed in a cone shape. In another embodiment, the first internal structure 1200 includes no first guiding portion. Further, in the present embodiment, the first guiding portion 1025 of the first internal structure 1200 protrudes out of the second internal structure 1300 through the outlet of the second internal structure 1300. However, in other embodiments, the first guiding portion 1025 does not protrude out of the second internal structure 1300 through the outlet of the second internal structure 1300, similarly to the third embodiment.

As described above, the present invention provides a fluid supply pipe of a multilayered structure such as a matryoshka doll in which a plurality of internal structures are housed in a pipe body. Since each internal structure includes a bubble generating portion, a large number of micro bubbles are generated in a fluid flowing into the fluid supply pipe. Although the number of internal structures is two or three according to the specific embodiments described herein, the present invention is not limited to the embodiments. The number of internal structures is not particularly limited.

Although some embodiments of the present invention have been described above, the embodiments are for illustrative purposes only and not intended to limit the technical scope of the present invention. It will be apparent to those skilled in the art that many other possible embodiments and various modifications of the present invention may be made in light of the specification and drawings. Although a plurality of specific terms are used herein, they are used in a generic sense only for the purpose of explanation and are not used for the purpose of limiting the invention. The embodiments and modifications fall within the scope and the spirit of the invention described in this specification and within the scope of the invention as defined in the appended claims and equivalents thereof.

What is claimed is:
1. A fluid supply pipe comprising:
a first internal structure;
a second internal structure; and
a pipe body configured to house the first internal structure and the second internal structure, the pipe body being formed in a hollow tube shape and having an inlet and an outlet, the first internal structure comprising:
- a head portion comprising a plurality of spiral vanes; and
- a body portion positioned downstream from the head portion and comprising a shaft portion having a circular cross-section and a plurality of protrusions protruding from an outer circumferential surface of the shaft portion, wherein the plurality of protrusions are formed in a net shape and form a plurality of flow paths on the outer circumferential surface of the shaft portion, and the second internal structure formed in a hollow shaft shape comprising:
- a head portion comprising a plurality of spiral vanes; and
- a body portion positioned downstream from the head portion and comprising a hollow shaft portion having a circular cross-section and a plurality of protrusions protruding from an outer circumferential surface of the hollow shaft portion, wherein the plurality of protrusions are formed in a net shape and form a plurality of flow paths on the outer circumferential surface of the hollow shaft portion, wherein at least a part of the first internal structure is housed in the hollow of the second internal structure;

a fluid flowing into the fluid supply pipe through the inlet is divided into two flows, and a part of the fluid flows into the hollow of the second internal structure and the rest of the fluid flows into the internal space of the pipe body; and the part of the fluid flowing through flow paths on the outer circumferential surface of the body portion of the first internal structure housed in the hollow of the second internal structure joins the rest of the fluid flowing through flow paths on the outer circumferential surface of the body portion of the second internal structure housed in the internal space of the pipe body after the fluid flows out of the second internal structure, and the fluid flows out through the outlet of the pipe body.

2. The fluid supply pipe of claim 1, wherein the first internal structure further comprises a fluid diffusing portion positioned upstream from the head portion and the fluid diffusing portion is configured to diffuse a fluid radially from the center of the fluid supply pipe.

3. The fluid supply pipe of claim 2, wherein the fluid diffusing portion of the first internal structure is one end of the first internal structure formed in a cone shape.

4. The fluid supply pipe of claim 2, wherein the fluid diffusing portion of the first internal structure is one end of the first internal structure formed in a dome shape.

5. The fluid supply pipe of claim 1, wherein the head portion of the first internal structure comprises a shaft portion having a circular cross-section and the plurality of spiral vanes.

6. The fluid supply pipe of claim 5, wherein the head portion of the first internal structure comprises three vanes and each of the vanes has its end spaced by 120 degrees from each other in the circumferential direction of the shaft portion.

7. The fluid supply pipe of claim 1, wherein the first internal structure further comprises a guiding portion positioned downstream from the body portion and the guiding portion is configured to guide a fluid toward the center of the fluid supply pipe.

8. The fluid supply pipe of claim 7, wherein the guiding portion of the first internal structure is one end of the first internal structure formed in a dome shape.

9. The fluid supply pipe of claim 7, wherein the guiding portion of the first internal structure is one end of the first internal structure formed in a cone shape.

10. The fluid supply pipe of claim 7, wherein the guiding portion of the first internal structure protrudes out of the second internal structure.

11. The fluid supply pipe of claim 1, wherein the hollow of the second internal structure has a circular inlet at its upstream end and a circular outlet at its downstream end, and
- the radius of the outlet of the hollow is smaller than the maximum distance from the center of the body portion of the first internal structure to the end of each protrusion.

12. The fluid supply pipe of claim 1, wherein the head portion of the second internal structure comprises a shaft portion having a circular cross-section and the plurality of spiral vanes.

13. The fluid supply pipe of claim 1, wherein the second internal structure comprises a guiding portion positioned downstream from the body portion and the guiding portion is configured to guide a fluid toward the center of the fluid supply pipe.

14. The fluid supply pipe of claim 13, wherein the guiding portion of the second internal structure is one end of the second internal structure formed in a truncated dome shape.

15. The fluid supply pipe of claim 13, wherein the guiding portion of the second internal structure is one end of the second internal structure formed in a truncated cone shape.

16. The fluid supply pipe of claim 1, further comprising a ring-shaped press plate comprising one or more supporting arms extending from its center.

17. The fluid supply pipe of claim 1, further comprising a press plate comprising two concentric rings of different radii and one or more supporting arms connecting the two concentric rings.

18. The fluid supply pipe of claim 1, further comprising a bolt configured to fix the first internal structure and the second internal structure to each other.

19. The fluid supply pipe of claim 1, wherein the pipe body comprises an inlet side member and an outlet side member, and the inlet side member and the outlet side member are connected by screw-joining.

20. The fluid supply pipe of claim 1 further comprising a third internal structure formed in a hollow shaft shape,
wherein the first to third internal structures are housed in the pipe body, and the third internal structure comprises:
- a head portion comprising a plurality of spiral vanes; and
- a body portion positioned downstream from the head portion and comprising a hollow shaft portion having a circular cross-section and a plurality of protrusions protruding from an outer circumferential surface of the hollow shaft portion, wherein the plurality of protrusions form a plurality of flow paths on the outer circumferential surface of the hollow shaft portion, and wherein at least a part of the second internal structure is housed in the hollow of the third internal structure;

the fluid flowing into the fluid supply pipe through the inlet is divided into three flows, and a first part of the fluid flows into the hollow of the third internal structure, a second part of the fluid flows into the hollow of the second internal structure, and the rest of the fluid flows into the internal space of the pipe body; and the first part of the fluid flowing through flow paths on the outer circumferential surface of the body portion of the second internal structure housed in the hollow of the third internal structure loins the second part of the fluid flowing through flow paths on the outer circumferential surface of the body portion of the first internal structure housed in the hollow of the second internal structure, and the rest of the fluid flowing through flow paths on the outer circumferential surface of the body portion of the third internal structure housed in the internal space of the pipe body after the fluid flows out of the third internal structure, and the fluid flows out through the outlet of the pipe body.

21. A machine tool comprising:

a fluid supply pipe of claim 1, wherein the machine tool allows coolant to flow into the fluid supply pipe to apply a predetermined flow characteristic to the coolant and discharges the coolant from the fluid supply pipe to a tool or a workpiece to cool it.

22. A shower nozzle comprising:

a fluid supply pipe of claim 1, wherein water of a predetermined temperature flows into the fluid supply pipe, a predetermined flow characteristic is applied to the water, and the shower nozzle discharges the water from the fluid supply pipe to improve a cleaning effect.

23. A fluid mixing apparatus comprising:

a fluid supply pipe of claim 1, wherein the fluid mixing apparatus allows a plurality of fluids having different properties to flow into the fluid supply pipe to apply a predetermined flow characteristic to the fluids to mix them and discharges the mixed fluids.

\* \* \* \* \*